United States Patent [19]

Takashima et al.

[11] E Patent Number: Re. 33,739

[45] Reissued Date of Patent: Nov. 12, 1991

[54] ELECTRONIC MUSICAL INSTRUMENT

[75] Inventors: Susumu Takashima, Tachikawa; Toyotarou Tokimoto, Ichinomiya; Kazuyuki Kurosawa, Tokyo, all of Japan

[73] Assignee: Casio Computer Co., Ltd., Tokyo, Japan

[21] Appl. No.: 453,040

[22] Filed: Dec. 12, 1989

Related U.S. Patent Documents

Reissue of:

[64] Patent No.: 4,633,748
Issued: Jan. 6, 1987
Appl. No.: 583,091
Filed: Feb. 23, 1984

U.S. Applications:

[63] Continuation of Ser. No. 291,435, Dec. 28, 1988, abandoned.

[30] Foreign Application Priority Data

| | | | |
|---|---|---|---|
| Feb. 27, 1983 | [JP] | Japan | 58-31284 |
| Feb. 27, 1983 | [JP] | Japan | 58-31285 |
| Feb. 27, 1983 | [JP] | Japan | 58-31286 |
| Jan. 27, 1984 | [JP] | Japan | 59-13075 |
| Jan. 27, 1984 | [JP] | Japan | 59-13076 |
| Jan. 27, 1984 | [JP] | Japan | 59-13077 |

[51] Int. Cl.[5] ..... G10H 7/00

[52] U.S. Cl. ..... 84/603; 84/616; 84/654; 84/DIG. 29

[58] Field of Search ..... 84/603-607, 84/616, 654, 681, 742, 453, 454, DIG. 29

[56] References Cited

U.S. PATENT DOCUMENTS

| | | | |
|---|---|---|---|
| 3,277,245 | 10/1966 | Sponga | 84/1.07 |
| 3,539,701 | 11/1970 | Milde | 84/1.28 |
| 3,634,596 | 1/1972 | Rupert | 84/1.28 |
| 3,647,929 | 3/1972 | Milde, Jr. | 84/1.28 X |
| 3,812,432 | 5/1974 | Hanson | 84/1.12 X |
| 4,014,237 | 3/1977 | Milde, Jr. | 84/1.12 |
| 4,168,645 | 9/1979 | Squire et al. . | |
| 4,230,012 | 10/1980 | Bommersbach et al. . | |
| 4,313,361 | 2/1982 | Deutsch | 84/1.01 |
| 4,377,961 | 3/1983 | Bode | 84/1.01 |
| 4,506,580 | 3/1985 | Koike | 84/1.28 X |

FOREIGN PATENT DOCUMENTS

| | | |
|---|---|---|
| 2430321 | 1/1975 | Fed. Rep. of Germany . |
| 7442567 | 7/1976 | France . |
| 51-129131 | 11/1976 | Japan . |
| 54-61453 | 5/1979 | Japan . |
| 549849 | 5/1974 | Switzerland . |
| 1291078 | 9/1972 | United Kingdom . |
| 1479005 | 6/1977 | United Kingdom . |
| 2013386 | 8/1979 | United Kingdom . |

OTHER PUBLICATIONS

Vocoder Systeme—12-44 Elektor Dec. 1970.

*Primary Examiner*—Stanley J. Witkowski
*Attorney, Agent, or Firm*—Frishauf, Holtz, Goodman & Woodward

[57] ABSTRACT

An electronic musical instrument comprising detection means to detect time positions of an initial part and a terminal part of a voice, extraction means to extract pitch data of the voice, a plurality of processing means to subject the pitch data to different processing operations, means to successively select the processed pitch data of the plurality of processing means in correspondence with the respective detected time positions, and musical sound production means to produce a musical sound on the basis of the processed pitch data delivered from the selection means.

28 Claims, 18 Drawing Sheets

Fig. 18

| COUNTER / COUNTER VALUE | ANC (14) | SNC (15) |
|---|---|---|
| 1-3 | $N_1$ | BN |
| 4-7 | $N_2$ | $N_2$ |
| 8-11 | $N_4$ | $N_4$ |
| 0 | $N_8$ OR BN | $N_8$ OR BN |

ELECTRONIC MUSICAL INSTRUMENT

Matter enclosed in heavy brackets [ ] appears in the original patent but forms no part of this reissue specification; matter printed in italics indicates the additions made by reissue.

*This application is a continuation of application Ser. No. 291,435, field Dec. 28, 1988, and now abandoned which is a Reissue of Ser. No. 06/583,091 filed Feb. 23, 1984 and issued as U.S. Pat. No. 4,633,748 on Jan. 6, 1987.*

BACKGROUND OF THE INVENTION

1. Field of the Invention

The present invention relates to an electronic musical instrument which generates waveforms electronically, and more particularly to an electronic musical instrument which produces musical sounds automatically without the operations of keys etc.

2. Description of the Prior Art

The progress of electronics has made it possible to electronically generate a musical sound waveform and to produce a musical sound with a loudspeaker. Apparatuses exploitating this technology are usually termed "electronic musical instruments". In general, the electronic musical instruments employ a method in which a musical sound to be produced is selected by a key. Further, they can produce the tone of a piano or any other musical instrument by assigning it with a lever switch or the like.

Since the electronic musical instrument selects musical sounds with keys as described above, the performance requires the technique of a piano and experience in the operations of the keys thereof. In other words, playing a person's accompaniment, for example, cannot be easily done and is possible for only those skilled in operating the electronic musical instrument. This signifies the problem that the conventional electronic musical instrument which is operated with keys cannot be simply played by anybody.

On the other hand, there are also apparatuses which convert a voice and produce the converted sound without using keys, for example, a musical sound signal conversion apparatus (Japanese Patent Application Publication No. 52-40973) which multiplies or demultiplies the fundamental frequency of a voice signal to produce a sound. In the Japanese Patent Application Publication, the fundamental frequency is obtained by detecting a zero-cross point of an input voice signal in an analogue manner. Thus, it is difficult to detect and process the input voice signal to produce the good musical sound.

SUMMARY OF THE INVENTION

An object of the present invention resides in providing an electronic musical instrument which can be simply played alone or for accompaniment without any special operating skill and which detects and processes an input voice signal in a digital manner, thereby producing a better musical sound.

According to one feature of the present invention, there is provided an electronic musical instrument comprising conversion means for converting a voice to digital data, extraction means for extracting a pitch of said digital data obtained by the conversion means, process means for processing the output of said extraction means, and musical tone production means for receiving the output of said process means and producing a musical tone in accordance with said output of the process means.

According to another feature of the present invention, there is provided an electronic musical instrument comprising detection means for detecting a time position of at least an initial part of voice and a terminal part of voice, extraction means for extracting pitch data of voice, plural process means for processing said pitch data in a different manner, selection means for successively selecting processed pitch data of said plural process means in correspondence with said detected time position and musical tone production means for producing a musical tone on a basis of the processed pitch data deprived from said selection means.

BRIEF DESCRIPTION OF THE DRAWINGS

FIG. 18 shows a relationship between the count values of the counters and pitch data in FIG. 16.

PREFERRED EMBODIMENTS OF THE INVENTION

Unlike the prior art wherein the musical scale and timing of a musical sound are selected with a key, in the present invention a person gives the musical scale and timing of a musical sound with his or her voice.

Figure 1:
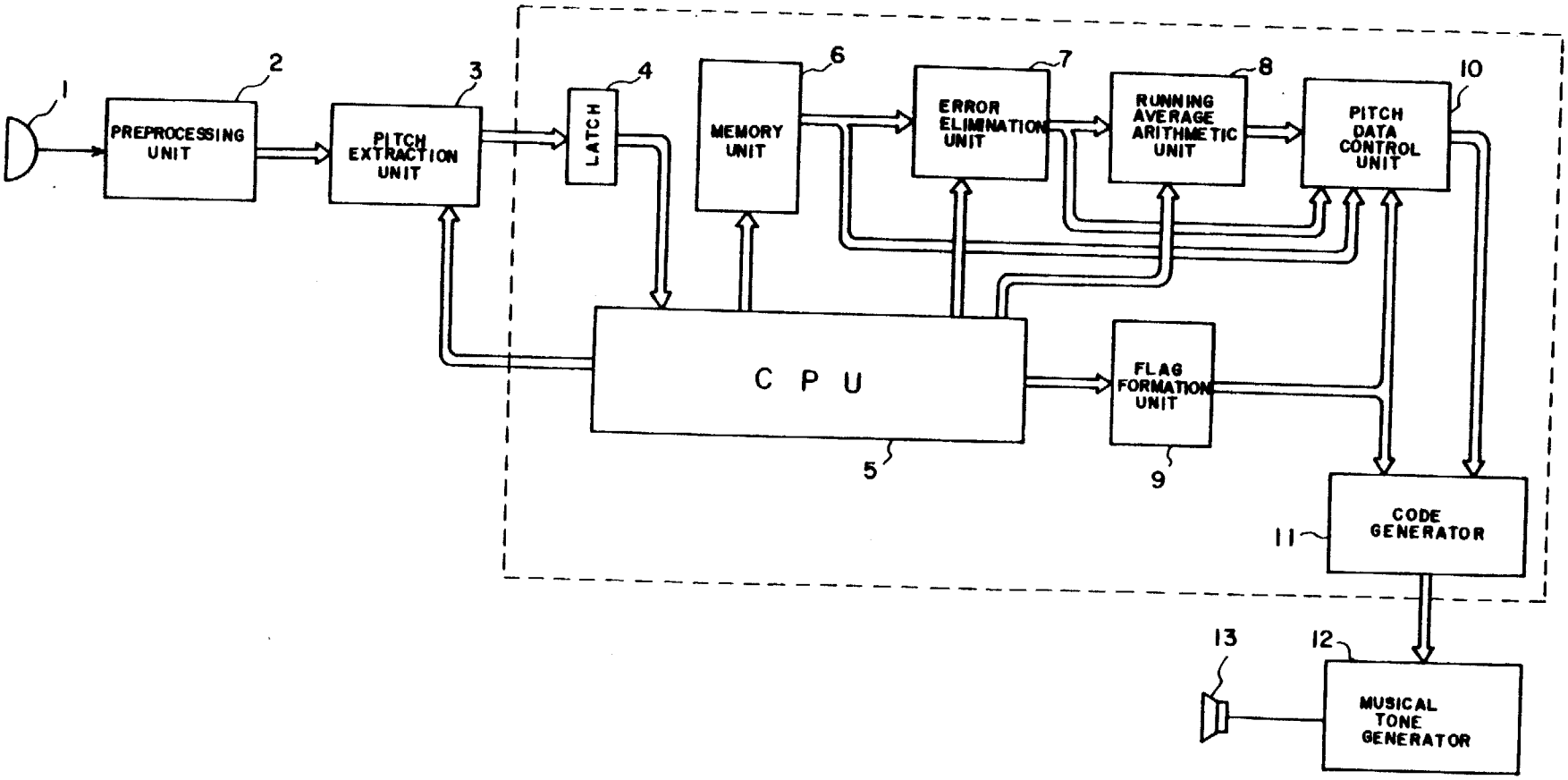
FIG. 1 shows a block diagram of a total system of an embodiment of the present invention.

FIG. 1 shows a block diagram of an embodiment of the present invention and a construction of an electronic musical instrument in which a musical sound is produced in accordance with a voice input. The output of a microphone 1 in which the voice is converted to an electric signal is applied to a preprocessing unit 2. The output of the preprocessing unit 2 is connected to a pitch extracting unit 3. The output of the pitch extracting unit 3 *for the determination of pitch in the musical sound* is supplied to a processor (CPU) 5 through a latch 4. The output of the processor 5 is connected to the pitch extracting unit 3, memory unit 6, error removing unit 7, running average arithmetic unit 8, and flag formation unit 9. The output of the memory unit is applied to the error elimination unit 7 and pitch data control unit 10, and the output of the error elimination unit 7 is supplied to the running average arithmetic unit 8 and pitch data control unit, respectively. The output of the running average arithmetic unit 8 is supplied to the pitch data control circuit 10. The output of the pitch data control unit 10 is applied to a code generator 11. The output of the code generator 11 is connected to a musical tone generator 12, the output of which is connected to a speaker in which the electric signal is converted to a sound.

The voice signal converted into the electric signal is applied to the preprocessing unit 2, thereby causing it to be preprocessed. The preprocessing is firstly conducted by removing a signal outside a desired band by a low pass filter (LPF), and so on. The removal of the signal outside the band is performed to prevent an error of the pitch extraction which is done in the next stage. Further, the preprocessing is conducted to amplify the input voice signal, the outside portion of the band of which is removed to have a predetermined amplitude by using an automatic gain control circuit.

The aforementioned input voice signal of the predetermined amplitude is converted to digital data by an analog/digital converter. The aforementioned amplification for producing a predetermined amplitude is performed to cause the bit number of the output of the analog/digital converter to be effective.

The voice signal dealt with the preprocessing unit 2, namely, digital voice signal, is applied to the pitch extraction unit 3. The pitch extraction unit 3 extracts a pitch of a basic frequency of the input voice signal by the processor (CPU) 5. The pitch extracting unit 3 comprises a voice data quantization circuit, a scale extracting circuit, and a three value correlation process circuit, thereby enabling an extraction of the pitch of the input voice. The data quantizer circuit successively obtains the maximum value and minimum value of the digital voice data over a specified period of time, and determines respective threshold levels for, e.g., three-valuing by the use of these maximum and minimum values. It three-values the input signal with the threshold levels. The musical scale extractor circuit is a circuit by which the three-valued voice data obtained by the three-valuing operation with the digital voice data is delayed in correspondence with a musical scale to be extracted, whereupon the delayed data and the input data are multiplied. A correlation concerning times is then made by this circuit. The resultant data represents the mere correlation of times between the delayed data and the input data, and it is further processed to extract the pitch. The extraction is executed by the aforementioned three-value correlation processing circuit. The three-value correlation processing circuit is a circuit which carried out window processing for the pitch extraction. More specifically, since the plurality of data are provided from the musical scale extractor circuit in correspondence with the musical scale to be extracted, they are subjected to the window processing by the three-value correlation processing circuit, that is, they are weighted in relation to the musical scale and are cumulated for the specified period of time (1 frame). A maximum value is obtained from among the cumulative values (cumulative values corresponding to delay times), and the pitch is found on the basis of the delay time corresponding to the maximum value and delivered as an output. This output is data relevant to the pitch of the fundamental wave of the voice (including harmonic waves) received as the input.

The pitch data delivered from the pitch extraction unit 3 is stored in the memory unit 6 through the latch 4 as well as the processor 5. The error elimination unit 7 is a circuit which detects the specified change of pitch data, for example, the change of at least 1 octave particularly in 1 frame by the use of the data stored in the memory unit 6 and which restores the data to the status before the change upon detecting the charge. In addition, there can also be a sudden change of the musical scale. In this event, the data changes after 1 frame. The data having had the error eliminated in the error elimination unit 7 is averaged in the running average calculation unit 8. The average is, for example, an arithmetical mean obtained by weighting the average up to the present time and data over 6 frames. More specifically, the averaging operation in the calculation unit 8 is such that the pitch data in frame unit successively received are stored in a shift register and shifted in frame unit, that the shift data of the 6 stages of the shift register and the average value are selected for cumulation within 1 frame period by a selector, and that less significant bits are rounded off by way of example.

The averaged data is delivered from the running average calculation unit 8 and is applied to the pitch data control unit 10, in which it is processed for producing a musical sound. In other words, the error elimination unit 7 mentioned above detects and obviates the malfunction of the pitch extraction attributed to external noise etc., to eliminate the step-like great change of data resulting from the malfunction of the pitch extraction. Also, the running average calculation unit 8 hysteretically averages the subtle change of data of the erroneous pitch extraction attributed to the subtle pitch change of the input voice or the like, to stabilize the data.

The human voice, which is not limited to singing, has consonant and vowel sounds. Although the pitches of dundamental waves are contained in many vowels, these are very few in some consonants. For this reason, while only a consonant is being produced (for example while "S" is being produced in case of giving forth "SA"), the pitch of the fundamental wave is sometimes extracted erroneously. It is the pitch data control unit 10 that prevents the malfunction of the musical sound production ascribable to such erroneous extraction, so as to establish the musical scale of the received voice. Using the power of the voice or the data of, e.g., the voice input detection, this control unit selects for its output the data stored in the memory unit 6, the output data of the error elimination unit 7 or the output data of the running average calculation unit 8.

The code generator 11 is a circuit which converts the output of the pitch control unit 10 into the code of the musical sound to be produced in the musical sound producer 2, namely, musical sound data.

The pitch extraction unit 3, memory unit 6, error eliminating circuit and running average calculating unit 8 are controlled by the processor 5. The pitch data control unit 10 and code generator unit 11 are controlled by the processor 5 through the flag formation unit 9. In other words, the flag is set in the flag formation unit 9 by the processor 5, thereby causing the pitch data control unit 10 and code generator 11 to be operated by the flag.

The output of the code generator 11, namely, the covered data, is applied to the musical tone generating unit 12, thereby designating the musical tone which should be produced from the speaker 13. In other words, the musical tone electric signal (analog signal) designated by the converted data of the code generator 11 is produced at the musical tone generator unit 12, thereby to be applied to the speaker 13. As a result, the musical tone is produced by the speaker 13 in accordance with the input voice applied to the microphone 1.

Figure 2:
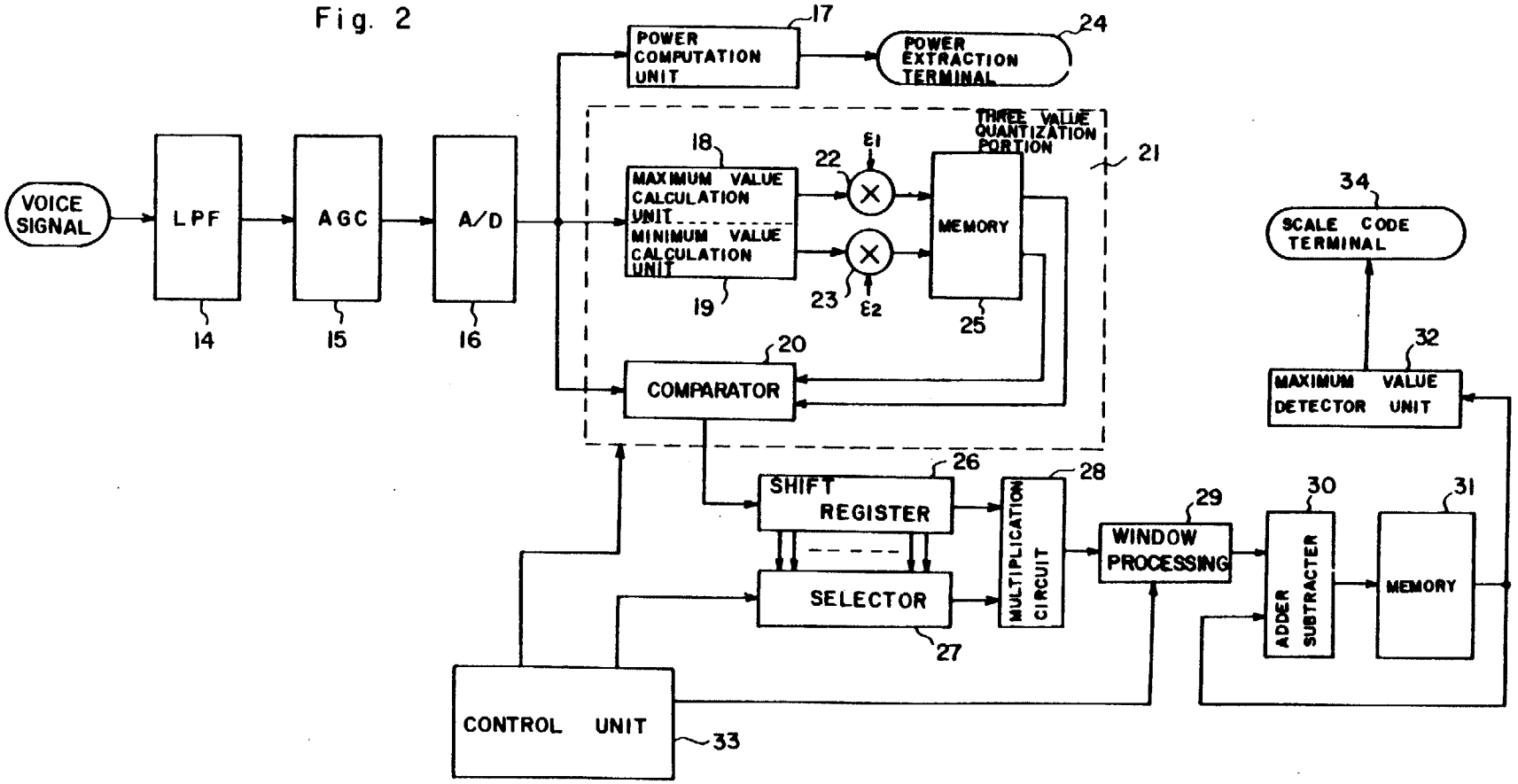
FIG. 2 is more detailed block diagram of an embodiment of the invention.

FIG. 2 shows a more detailed block diagram of a second embodiment of the invention. Particularly, it shows a detailed block diagram of the preprocessing unit 2 and pitch extraction unit 3 shown in FIG. 1. The voice signal, namely, the electric signal converted from the voice inputted from the microphone 1, is inputted into an automatic gain control circuit 15 through a low pass filter 14 and the output thereof is applied to an analog/digital converter 16. The output of the analog/-digital converter is applied to a maximum value calculation portion 18, a minimum value calculation portion 19, and the first input of a comparation 20 of the three value quantization unit 21, and the power computation unit. The three value quantization unit 21 comprises the maximum value calculating unit 18, the minimum value calculating unit 19, a comparator 20, multiplication circuits 22 and 23, and a memory 25. The output of the power computation unit 17 is connected to a power extraction terminal 24. The outputs of the maximum calculating unit 18 and the minimum value calculating unit 19 are respectively applied to the first inputs of the multiplication circuits 22 and 23. A coefficient data $\epsilon_1$, $\epsilon_2$ are supplied to the multiplication circuits 22 and 23. The outputs of the multiplication circuits 22 and 23 are inputted to the second and third inputs of the comparator 20. The output of the comparator 20 is applied to a shift register 26 as the output of the three value quantization unit 21. A plurality of the first outputs of the shift register 26 are correspondingly supplied to a plurality of inputs of a selector 27. The output of the last stage of the shift register 26 and the output of the selector 27 are applied to the first and second inputs, respectively. The output of the multiplication circuit 28 is inputted to the first input of the adder/subtracter 30 through a window processing circuit 29. The output of the adder/subtracter 30 is connected to a memory 31. The output of the memory 31 is applied to the second input of the adder/-subtracter 30 and the input of a maximum value detector 32. Control outputs of a control unit 33 are respectively applied to control inputs of a three value quantization unit 21, selector 27 and window processing circuit 29. An output of the maximum value detector unit 32 is applied to a scale code terminal 34.

By way of example, a musical sound produced from a musical instrument of the voice of a man is converted into an electric signal by the microphone 1. The voice signal or electric signal is applied to the low-pass filter 14 and has a higher frequency region thereof removed. The low-pass filter 14 is a low-pass filter having a cutoff frequency of, e.g., 900 Hz which serves to remove noise outside the voice frequency band and also to control the band of the voice signal. This filter may well be a band-pass filter. The malfunctions of pitch extraction to be executed below, attributed to higher harmonics etc., are prevented by the filter 14. The band-limited voice signal having had the noise outside the band eliminated is amplified in the automatic gain control circuit 15 so as to become a specified amplitude value. The circuit 15 is inserted in order to validate the output bits of the analog-to-digital converter circuit 16 of the succeeding stage. By way of example, let it be supposed that the maximum and minimum conversion voltages of the A/D converter circuit 16 be ±5 V. Then, when the absolute values of the maximum value and minimum value of the output of the automatic gain control circuit 15 are greater than 5 V, the output of the A/D converter circuit 16 becomes invalid. Further, in a case where the absolute values of the maximum and minimum value of the output of the automatic gain control circuit 15 are much smaller than 5 V and are, e.g., 0.5 V, the digital data value of the A/D converter circuit 16 also becomes small, and the more significant bits thereof become low level, so that the number of valid bits decreases. To the end of preventing these drawbacks, the automatic gain control circuit 15 operates so that the maximum and minimum values of the output thereof may not exceed the conversion voltage range of the A/D converter circuit 16 and may not become small absolute values. However, the automatic gain control circuit 15 does not operate so as to render the maximum and minimum values constant at all times, but it operates so as to have a gain dependent upon the maximum and minimum values of the voice signal and to deliver a signal of an amplitude value within a substantially specified range. In the absence of the input, the gain become maximal, but the output is naturally null.

The voice signal converted into the specified amplitude value is provided from the automatic gain control circuit 15, and is converted into the digital data value in the analog-to-digital converter circuit 16.

The power computation unit 17 is a circuit which takes the absolute value of the digital output of the A/D converter circuit 16 and cumulates such absolute values over 1 frame of a specified range. That is, the digital outputs of the A/D converter circuit 16 have their signs removed and are cumulated. The cumulated result is a value relevant to the power of the voice signal, and the power computation unit 17 delivers the result to the power extraction terminal 24.

The output of the analog-to-digital converter circuit 16 is applied to the maximum value calculating unit 18 and the minimum value calculating unit 19 of the three value quantization portion 21. The maximum and minimum values during a predetermined period of the converted voice digital data are detected at the maximum value calculating portion 18 and the minimum value calculating portion 19. This is performed for obtaining a threshold level used for converting the analog signal to three values.

The maximum and minimum values are detected at the maximum value calculating portion 18 and the minimum value calculating portion 19. The maximum and minimum values are multiplied by the predetermined coefficient $\epsilon_1$ and $\epsilon_2$ at the multiplication circuits 22 and 23, thereby storing them in the memory 25. The comparator 20 compares the digital data output of the analog-to-digital converter 16 with the threshold levels. As the maximum and minimum values are multiplied by $\epsilon_1=0.4$ and $\epsilon_2=0.4$, for example, in the multiplication circuits 22 and 23, a threshold level is provided in proportion to an amplitude value of the inputted signal. The conversion to three values is performed in the comparator unit 20 in accordance with a threshold level which is normalized at the maximum and minimum amplitude value.

Figures 3A, 3B:
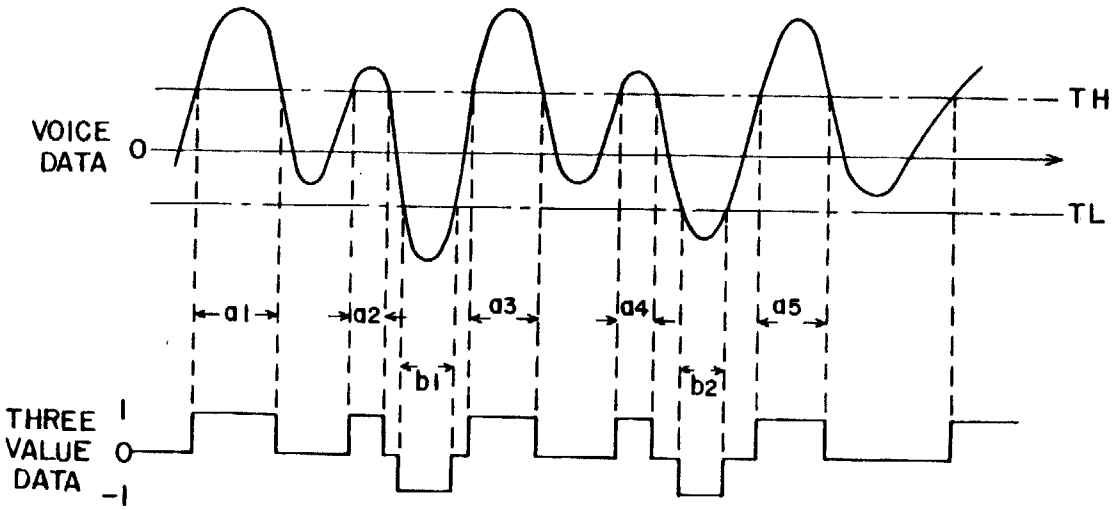
FIG. 3A depicts a wave form diagram of the input voice and FIG. 3B represents three value data in accordance with the input voice.

FIGS. 3A and 3B show a wave form diagram of the voice data, namely, the input of the analog-to-digital converter 16 and the signal obtained by converting said data to three values.

When voice data is larger than a threshold level TH obtained by multiplying the maximum value by $\epsilon_1$, a three value data is "1" (as shown in the ranges $a_1$ to $a_5$ of FIG. 3B). When voice data is smaller than a threshold level TL obtained by multiplying the minimum value by $\epsilon_2$, a three-valued data is $-1$" (as shown in the ranges $b_1$ and $b_2$). If voice data is between the threshold level TH and the threshold level TL, the three-valued data is "0". The three-valued data comprises two bits, namely, a sign bit and a data bit, as shown in a table 1. When the data is "0" or "1", the sign bit is "0". When the data is "$-1$", the sign bit is "1". The data bit shows its absolute value. When the three-valued data is "$\pm 1$", the data bit is "1". When the three-valued data is "0", the data bit is "0".

TABLE 1

| three-valued data | sign data | data bit |
|---|---|---|
| $-1$ | 1 | 1 |
| 0 | 0 | 0 |
| 1 | 0 | 1 |

The comparator 20 provides three-valued data with regard to a predetermined period, namely, one frame period, using threshold levels obtained from the maximum and minimum data during the predetermined period. These sequential operations are controlled by control signals produced by the control portion 33.

The output of the comparator 20, namely, the three-valued data, is applied to the shift register 26 and is sequentially shifted. Shifted last data of the shift register is added to the first input data of the multiplication circuit 28. The data following the last shifted data is still stored in the shift register. A plurality of data which is delayed by the predetermined number of steps, namely, the number of shift clocks, is selected by the selector 27 in accordance with a selection signal produced by the control unit 33, thereby to be applied to the second input of the multiplication circuit 28. The data applied to the first and second inputs of the multiplication circuit 28 are multiplied therein. The multiplication is conducted to obtain the product $xj \cdot x(j+\tau i)$, supposing that the last shifted data is xj and the data delayed by a predetermined clock $\tau i$ from the data xj is $x(j+\tau i)$. The necessary number of the multiplication is conducted within one shift clock and the output thereof is supplied to the first input of the adder/subtracter circuit 30 through the window processing circuit 29. The necessary number of the multiplication is selected by the control unit 33 and corresponds to a scale. It is conducted 38 times as the total amount of delay time $\tau_0 \sim \tau hd$ 37 corresponding to a scale $E_2 \sim F_5$. Supposing that a shift clock frequency fs is 32.768 KHz, the scale frequency fi corresponding to the delay time is expressed as $fi=fs/\tau i$. $\tau i$ is in proportion to the twelfth root of 2. $\tau i$, corresponding to $F_5$, $E_5$, . . . $F_2$, $E_2$, is expressed as $\tau_{37}=46$, $\tau_{36}=49$ . . . $\tau i=373$, and $\tau_0=395$, respectively.

The window processing circuit 29 multiples a coefficient corresponding to a delay selected by the selector 27. Supposing that the coefficient, namely, the window value is $w(\tau i)$, the value inputted to the adder/subtracter circuit 30 is $xj \cdot x(j+\tau i) \cdot w(\tau i)$. The coefficient is selected in accordance with the select signal supplied to the selector 27 from the control circuit 33. The adder/-subtracter circuit 30 and memory 31 are used for accumulation. The output of the memory is applied to the second input of the adder/subtracter in accordance with $\tau i$ to perform an adding and subtracting operation with regard to the output of the window processing circuit 29, resulting in storing the output in the memory 31 again. The data to be stored in the memory 31 is as follows.

$$R'(i) = \sum_{j=0}^{N} xj \cdot x(j+\tau i) \cdot w(\tau i), \quad (1)$$

where N represents the number of a shifting, namely, that of a counting with regard to $\tau i$ within the predetermined range. $w(\tau i)$ is constant as to j in the equation (1). Therefore, the following equation is established.

$$R'(\tau i) = w(\tau i) \cdot \sum_{j=0}^{N} xj \cdot x(j+\tau i) = w(\tau i) \cdot R \cdot (\tau i), \quad (2)$$

where $R(\tau i)$ represents an accumulated value of $xj \cdot x(j+\tau i)$ and a correlation value corresponding to a predetermined time delay.

As apparent from Equation (2), the aforementioned $w(\tau_i)$ is multiplied by the correlative value corresponding to the specified delay time and becomes the window value corresponding to the delay time of the window function. Thus, the error of overtone extraction attributed to the three-valuing operation can be prevented (window processing). In some cases, the second or third higher harmonic component is higher in level than the fundamental wave. It is therefore important to execute the multiplication of the window value, namely, the window processing.

The output of the memory portion 31 is applied to the maximum value detector portion 32, and the maximum value in the memory portion 31 is detected. Values stored in the memory portion 31 are cumulative values each of which is the result obtained by multiplying the value of the specified time delay and the present-time value and then subjecting the product to the window processing. Therefore, they are values corresponding to the respective pitches or frequency components of input voice signals within a specified period of time. (The specified period of time indicates 1 frame. In a case where 1 frame consists of 800 system clock intervals, the stored values become cumulative values of 400 times.) That is, the value detected in the maximum value detector portion 32 is the maximum value of the signals of the respective frequency components of the input voice signals within the specified period of time.

The maximum value detector portion 32 turns the pitch or frequency data having the maximum value into a code by way of example, to deliver the code to the musical scale code terminal 34.

According to the above-described operation, the musical scale code data associated with a keynote of the voice signal is outputted from the musical scale code terminal 34 and is stored in the latch 4. Then, the operation of an error elimination, running average, and so on are conducted.

Figure 4:
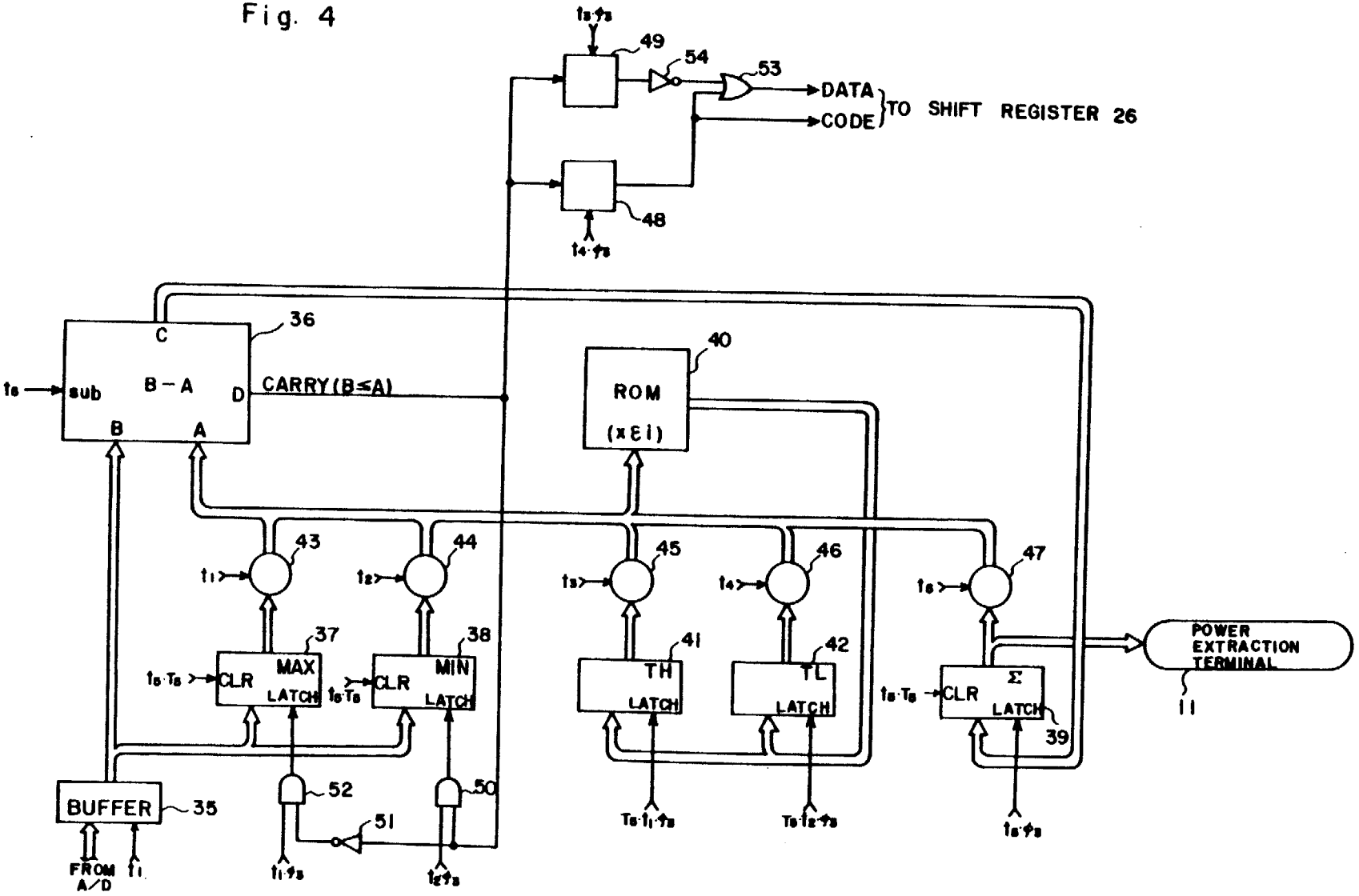
FIG. 4 is a detailed circuit diagram of three-valuing portion of FIG. 2.

FIG. 4 shows a detailed circuit diagram of the three-valuing portion 21 and power computation portion 17 of FIG. 2. The output of the analog/digital converter 16 is stored in the buffer register 35. The output is applied to a minuend input B of the adder/subtracter and the inputs of the registers 37, 38. The output C of the adder/subtracter circuit 36 is inputted to the latch circuit 39. The data output from ROM40 is applied to the inputs of latch circuits 41 and 42.

The outputs of the latch circuits 37, 39, 41, 42 are commonly connected through the respective gate circuits 43 to 47 and are inputted to a subtrahend input A of the adder/subtracter circuit 36 and an address input of ROM40. These gate circuits 43 to 47 are turned to "on" during a predetermined period $T_1$ to $T_5$ within one frame. A carry output D of the adder/subtracter circuit 36 is connected to the respective inputs of latch circuits 48 and 49, the first input of an AND gate 50, and the first input of the AND gate 52 through an inverter 51.

The output of the latch circuit 48 is applied to the shift register 26 as the sign bit and is supplied to the first input of an OR gate 53. The output of the latch circuit 49 is connected to the second input of the OR gate 53 through an inverter 54. The output of the OR gate 53 is applied to the shift register 26 as the data bit. The outputs of the AND gates 50 and 52 are applied to the clock terminals of the latch circuits 38 and 37.

The operation of an embodiment of the present invention will be described by referring to timing charts of FIG. 5 and FIG. 6.

In the embodiment of the present invention, data is processed in a frame unit as mentioned above. 1 frame includes 800 data, and the maximum value and minimum value of the amplitudes of the data are calculated in frame units. The maximum and minimum values are determined after the last data of 1 frame has been received as an input. The comparator portion 20 compares the next input data with threshold levels concerned with the maximum and minimum values.

Figure 5:
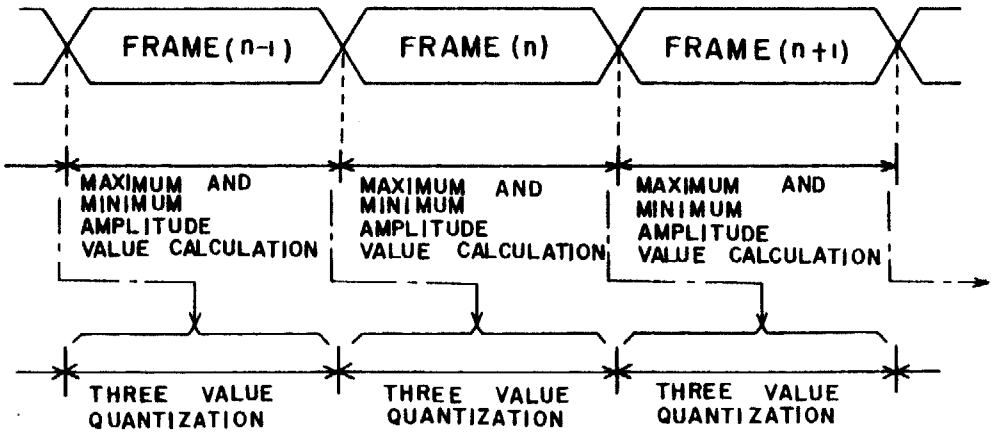
FIG. 5 shows a general timing chart of the embodiment of the present invention.

More specifically, as illustrated in FIG. 5 by way of example, the maximum and minimum values obtained in a frame (n−1) are employed for the comparisons of data in the next frame (n). Further, the values obtained in the frame (n) are used in a frame (n+1). In other words, the three-value quantization portion 21 detects the maximum and minimum values of the immediately preceding frame, finds the threshold levels from these maximum and minimum values and finally three-values the data of the next frame in the comparator portion by the use of the levels.

Referring back to FIG. 4, the data received from the analog-to-digital converter circuit 16 is stored in the buffer register 35 in a period of time $t_1$. First, data $x_0$ shown in FIG. 6 is stored. The data is applied to the adder/subtracter circuit 36. This adder/subtracter circuit 36 operates as an adder circuit when its addition/subtraction control input SUB receives a high level, and as a subtracter circuit when a low level. Since the low level is applied to the control input SUB of the adder/subtracter circuit 36 except for a period of time $t_5$, the subtracter circuit is established during periods of time $t_1$–$t_4$. In the period of time $t_1$, the gate circuit 43 is "on", and data stored in the latch circuit 37 is applied to the adder/subtracter circuit 36 and subjected to subtraction. Herein, in a case where the data stored in the buffer register 35 is greater than the data stored in the latch circuit 37, the carry terminal D of the circuit 36 provides the low level. Since the latch circuit 37 stores the maximum value, the data having been stored in the buffer register 35 is stored in the latch circuit 37 on this occasion. The low level of the carry terminal D is inverted into the high level by the inverter 51, and this high level enters the AND gate 52. Therefore, the AND gate 52 turns "on", and a clock $\phi_3(t_1 \cdot \phi_3)$ in the period of time $t_1$ enters the clock terminal of the latch circuit 37, so that the aforementioned data applied to the input of the circuit 37 is latched. Conversely, in a case where the data stored in the buffer register 35 is smaller than the data stored in the latch circuit 37, the carry terminal D of the adder/subtracter circuit 36 becomes the high level. Since the signal or high level is applied to the AND gate 52 through the inverter 51, the AND gate 52 turns "off", and the clock $t_1 \cdot \phi_3$ does not enter the latch circuit 37. That is, the data stored in the latch circuit 37 remains unchanged. This operation is executed in the period of time $t_1$.

Next, in the period of time $t_2$, the gate circuit 44 turns "on" and the data stored in the latch circuit 38 is applied to the adder/subtracter circuit 36. Likewise to the above, the subtraction is executed in the adder/subtracter circuit, and the magnitudes of the data are compared. In a case where the data stored in the buffer register 35 is smaller than the data stored in the latch circuit 38, the carry terminal D provides the high level. Since the latch circuit 38 stores the minimum value, the data stored in the buffer register 35 is latched in the latch circuit 38 on this occasion by an operation discussed below. The AND gate 50 is supplied with the high level of the carry terminal D. Therefore, a clock $\phi_3(t_2 \cdot \phi_3)$ in the period of time $t_2$ during which the AND gate 50 is "on" enters the clock terminal of the latch circuit 38, so that the aforementioned data applied to the input of the circuit 38 is stored.

This operation will be repeated as to the data $X_0 \sim X_{898}$. Upon the frame period $T_5$ (namely, the period corresponding to the last data $X_{799}$), the gate circuit 43 is turned "on" at $T_1$, and the data of the latch circuit 37 is stored in ROM 40. That content of the memory which is designated by the data is applied to the input of the latch circuit 41 and is stored in the latch circuit 41 at a timing of the clock $T_5 \cdot t_1 \cdot \phi_3$. Likewise, at a period of $t_2$ of the period $T_5$, the gate circuit 44 is turned to "on", thereby applying the data of the latch 38 to ROM 40. That content of the memory which is designated by the dataiis applied to the input of the latch circuit 42 and is stored in the latch circuit 42 at a timing of a clock $T_5 \cdot t_2 \cdot \phi_3$. As the data applied to ROM 40 is a maximum and minimum value, the threshold levels corresponding to the maximum value and minimum value are stored in the latch circuits 41 and 42 by storing the result multiplied by a predetermined value, for example, $\epsilon_1 = 0.4$ and $\epsilon_2 = 0.4$ in the memory, the address of which is designated thereby. In accordance with the able operation, the threshold levels associated with the maximum value and minimum value within one frame are stored in the latch circuits 41 and 42.

In the remaining period of the data $X_0 \sim X_{799}$, namely, in the period $t_3$ and $t_4$, an operation to form three values is conducted in parallel with the above-mentioned operation of detecting threshold level. The threshold levels associated with the maximum and minimum values in the previous frame are then stored in the latch circuits 41 and 42.

Firstly, the data $X_0$ is stored in the buffer register 35 as explained in the above prescription. The gate circuit 45 is turned to "on" during the period of $t_3$.

The data stored in the latch circuit 41 is added to the substrahend input A of the adder/subtracter circuit 36. The content of the buffer register, namely, the data $X_0$, is applied to the minuend input B. It is outputted from the carry terminal D whether one data is larger than the other, and the carry output is stored in the latch 49 at a timing of clock $\phi_3$ within the period $t_3$, namely $t_3 \cdot \phi_3$. When the data stored in the latch circuit 49 is at a low level, the data $X_0$ stored in the buffer register 35 is larger than the threshold level stored in the latch circuit 41. When the data stored in the latch circuit 49 is at a high level, the data $X_0$ stored in the buffer register 35 is smaller than the threshold level stored in the latch circuit 41.

Next, at a period $t_4$, the gate circuit 46 is turned to "on" as is done in the description, and the data stored in the latch circuit 42 applied to the subtrahend input A of the adder/subtracter 36. On the other hand, the data $X_0$ is added to the minuend B as is done at a period of $t_3$. The information of the data's quantity relationship is outputted from the carry terminal D and is captured by the latch 48 at a clock $\phi_3$ within the period $t_4$, namely, at a timing of $t_4 \cdot \phi_3$. When the data stored in the latch circuit 48 is in a low level, the data $X_0$ stored in the buffer register 35 is larger than threshold levels stored in the latch 42 (which corresponds to the minimum value). Similarly the relationship is reversed when thedata stored is in a high level.

The data of this latch circuit does not charge until the next clock. At the same time subtraction result is received and is converted to three value data by an encoder comprising an inverter 54 and OR date 53, thereby being supplied to the shift register 26. When the both datum stored in the latch circuits 48 and 49 are in the low level, the data stored in the buffer register 35, namely, the data $X_0$ is larger than the threshold level relative to the maximum value, causing the output of the inverter 54 to be at the high level and to be outputted from the OR gate 53 as data bit and the low level of the latch circuit 48 is outputted as a sign bit. When both data are in the high levels, the data stored in the buffer register 35 is smaller than the threshold level relative to the minimum value. Thus, the output of the latch circuit 49, namely, the high level signal, is delivered from the OR gate 53 as the data bit and the sign bit becomes a high level. In the all other situations, namely, in cases where a signal is smaller than a threshold level relative to the maximum data and is larger than a threshold level relative to the maximum data, the high level is stored in the latch circuit 49 and the low level is stored in the latch circuit 48. At this time, the high level of the output of the latch circuit 49 is inverted by the inverter 54, thereby applying the low level to the OR gate 53 and also applying the low level of the output of the latch circuit 48 to the OR gate 53, with the result that the output of the OR gate 53 becomes low level. Thus, the low level is applied to the shift register 26. The output of the latch 48, namely, the low level, is delivered as the sign data. The three-valued data of the output is the sign data encoded with two bits as shown in the table 1. The above described operation of the periods of $t_3$ and $t_4$, is similar to the operation of detecting the maximum and minimum values, which is described above. Such operation is performed as to $X_1$ and further $X_2 \sim X_{799}$, successively. Further, such sequential operation is performed by changing the threshold level at every frame unit. This is done by simply accumulating the value of the buffer register 35, at a period of $t_5$, which was not described in the above-mentioned operation. At a period of $t_5$, the gate circuit 47 is turned "on", thereby adding the content of the latch circuit 39 to the input A of the adder/subtracter circuit 36. The content of the buffer register 35 is applied to the input B. On the other hand, the low level is applied to the adder/subtracter control terminal SUB of the adder/subtracter circuit 36, the adder/subtracter circuit 36 performs an adder operation unlike the periods of $t_1$, $t_2$, $t_3$ and $t_4$. As a result, the data added to the inputs A and B is outputted from the output terminal C, thereby being supplied to the input of the latch 39. The outputted data is received by the latch 39 at a clock of $t_5 \cdot \phi_3$. The latch circuit 39 is reset during the period of $T_5 \cdot t_5$, namely, a period $t_5$ within the frame period $T_5$ corresponding to the last data. Thus, the data $X_0 \sim X_{799}$ within one frame is accumulated, thereby being delivered from the power extraction terminal 11. $\tau_0 \sim \tau_{37}$ shown in FIG. 6 show a correlation calculation performed concerning one data.

Each datum has 40 slots and the calculation is conducted only for $\tau_0 \sim \tau_{37}$ in the embodiment of this invention. The clocks $\phi_1$, and $\phi_2$ show the clocks necessary for a calculation performed at that time.

The adder/subtracter circuit 36 of FIG. 4 detects a start and a initial terminal part of the voice and selects a pitch extraction data.

In the above-described embodiment, it is explained that the input data is the voice signal and any signal may be processed through a quantization, operation, similar to the above-described process.

Further, three value quantization is performed in the above embodiment and other multi-level quantization may be possible by increasing the number of the subtraction or the comparison process in accordance with the periods $t_3$ and $t_4$, and by increasing the number of circuits associated with it, for example, a ROM and latch circuit.

The processed result thus obtained, namely, the three-valued data, is applied to the shift register 26, and the correlation and pitch extraction process it performed.

Figure 7:
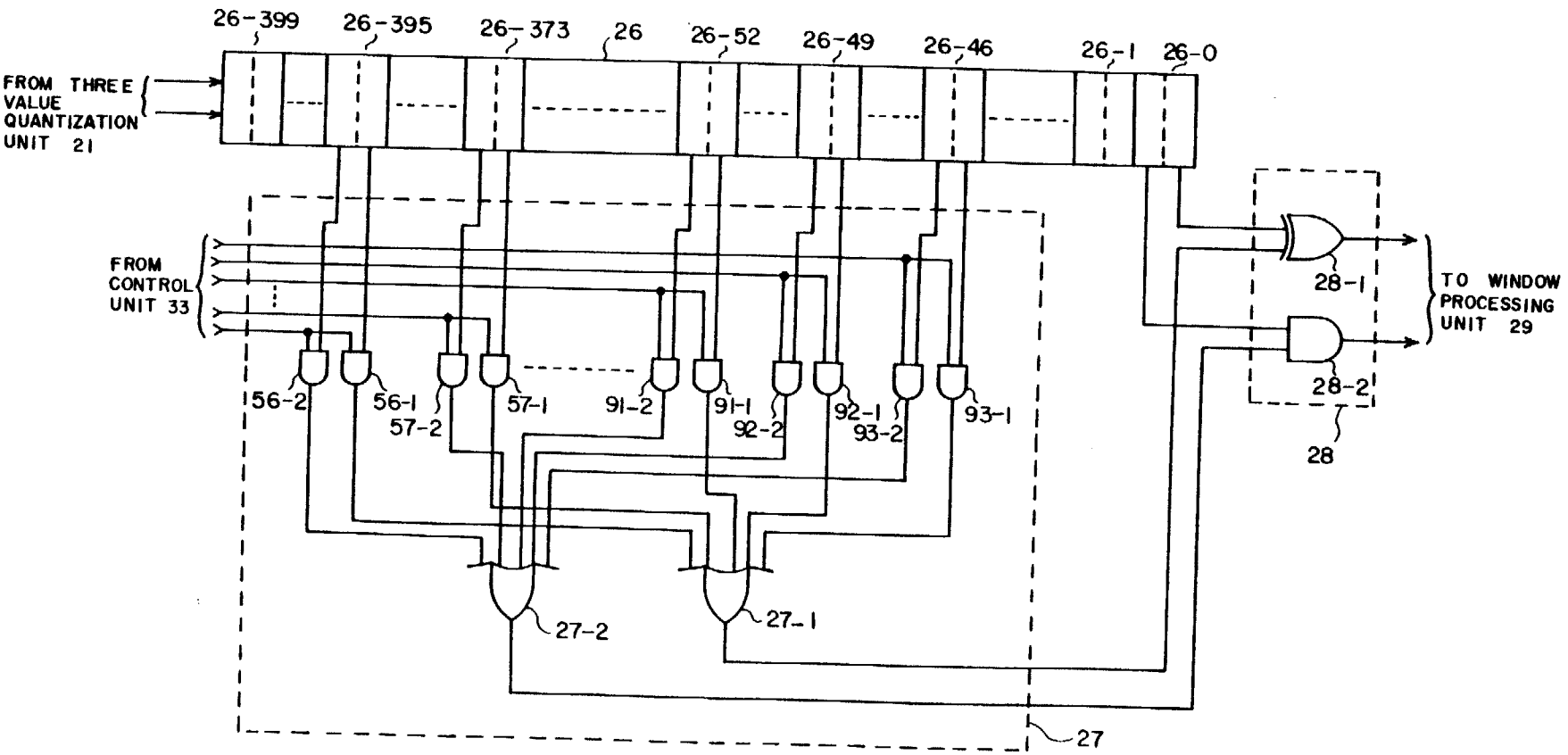
FIG. 7 shows a circuit diagram of the shift register and selector of FIG. 2.

FIG. 7 shows the shift register 26 and selector 27 of FIG. 2.

The shift register 26 comprises the shift registers 26-0 to 26-399 of 400 steps. The three value data of the three value quantization portion 8, i.e., the output of the OR gate 53 and latch circuit 48 in FIG. 4 is applied to the shift register 26-0 to 26-399. A two bit parallel shifting is conducted at the shift registers 26-0 to 26-399. The two bit outputs of the shift register 26-0 are applied to the first input of an exclusive OR gate 28-1 and the first input of the AND gate, respectively. The predetermined outputs of the shift registers 26-0 to 26-399 are respectively applied to the first inputs of AND gates 93-1 to 56-1 and 93-2 to 56-2. The selection signals from the control units 33 are applied to the second inputs of AND gates 93-1 to 56-1 and 93-2 to 56-2. The outputs of the AND gates 93-1 to 56-1 are applied to the OR gate 27-1 and the outputs of the AND gates 93-2 to 56-2 are supplied to the OR gate 27-2. The outputs of the OR gates 27-1 and 27-2 are, respectively applied to the second inputs of the exclusive logic OR gate 28-1 and AND gate 28-2 of the multiplication circuit 28. The output thereof is applied to the window processing circuit 29.

The three valued data of two bits supplied from the three value quantization portion 21 is supplied to the shift register 26-399 and is sequentially shifted in the shift registers 26-399 to 26-0. When the three-valued data within one frame is stored in the shift registers 26-399 to 26-0, the selection signal is delivered from the control unit 33. When the AND gates 56-1 and 56-2 are selected, signal lines connected to the second inputs of the AND gates 56-1 and 56-2 become high level and two bit outputs of the shift register 26-395 are delivered from the AND gates 56-1 and 56-2. As the second inputs of the other AND gates 57-1 to 93-1 and 57-2 to 93-2 receive low level signals from the control unit 33, the outputs thereof become low levels. The outputs of the AND gates 56-1 to 93-1 are applied to the OR gates 27-1 and the outputs of the AND gates 56-2 to 93-2 are applied to OR gate 27-2. The outputs of OR gates 27-11 and 27-2 produce the same data as the outputs of the AND gates 56-1 and 56-2, namely, the output of the shift register 26-395. The AND gates 56-1 to 93-1, 56-2 to 93-2 and the OR gates 27-1 and 27-2 operate as a selector for selecting the output of the shift register 26 as described above.

As stated before, the first input of each of the AND gates 56-1 to 93-1 and 56-2 to 93-2 is supplied with the corresponding one of the specified outputs of the shift register steps 26-0 to 26-399. The specified outputs are the outputs of the register steps which have delays proportional to the periods of the respective musical scales $E_2$–$F_5$. For example, the output of the shift register step 26-395 corresponds to the musical scale $E_2$, that of 26-373 to $F_2$, that of 26-36 to $E_5$, and that of 26-35 to $F_5$. They are successively selected within 1 shift clock, and multiplications to be described below are executed. The exclusive logic OR gate 28-1 is supplied with the sign bit of the output of the shift register step 26-0 and the sign bit of the output of the shift register step selected by the selector 27-1. The exclusive logic OR gate is such that, when both the first and second inputs are "1" or "0", the output becomes "0", whereas when one of the first and second inputs is "1" and the other is "0", the output becomes "1". Here, the logics "0" and "1" correspond to the foregoing low level and high level respectively. Meanwhile, regarding the signs of the multiplication, when both the multiplier and the multiplicand are minus or plus, the product becomes plus, and when one of them is plus and the other is minus, the product becomes minus. Therefore, the operations of the exclusive logic OR gate 28-1 correspond exactly to the multiplication.

The AND gate 28-2 is supplied with the data bit of the output of the shift register step 26-0 and the data bit of the output of the shift register step selected by the selector 27-2. The data bit is 1 bit except a sign bit. When both the inputs are "1", the output becomes "1", whereas the output becomes "0" in any other case. These operations are effected by the AND gate 28-2.

As a result, the multiplication circuit 28 operates as a multiplier unit of 2 bits including a sign as indicated in Table 2. The output of the multiplication circuit 28 is applied to the window processing circuit 29, and is multiplied by a coefficient corresponding to the selected delay time.

TABLE 2

| | −1 | 0 | 1 |
|---|---|---|---|
| −1 | 1 | 0 | −1 |
| 0 | 0 | 0 | 0 |
| 1 | −1 | 0 | 1 |
| | Three-valued data | | |

Since the multiplication stated above is executed with the data delayed by the specified time, out output of the multiplication circuit 28 becomes data having a correlative value. The specified time delay is determined by the shift clock and the number of clock pulses. By way of example, assuming the shift clock frequency to be 32.768 kHz, the dalay of the shift register step 26-395 becomes approximately 12 msec, which corresponds to approximately 83 Hz in terms of frequency. That is, the correlative value becomes a value relevant to 83 Hz (musical scale $E_2$). This value corresponds to the case of selecting the shift register step 26-395, and by selecting the other shift register steps, the correlative values of the musical scales corresponding thereto can be obtained.

In the embodiment of FIG. 7, the shift register steps corresponding to the musical scale extracted within one clock are sequentially selected and the multiplication is conducted.

Instead of performing the selection corresponding to the aforementioned musical scale, the outputs corresponding to all of the musical scale tones are respectively added to the multiplier circuits having the number of the extraction musical scale tone, and the result is applied to the up and down counter, thereby using the adder and subtracter circuit 30 and the memory 31 shown in FIG. 2 in common.

Figure 8:
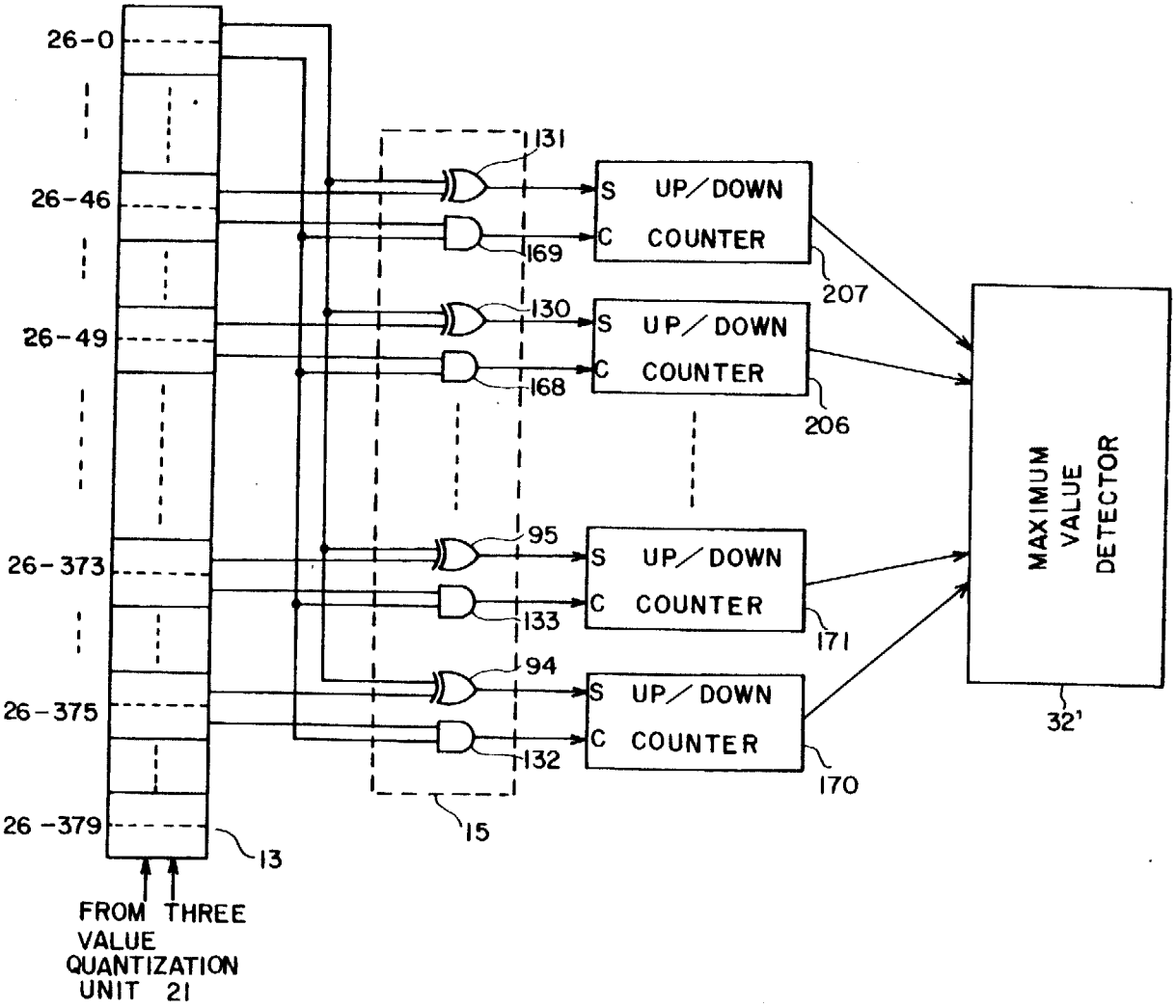
FIG. 8 is a block diagram of an embodiment of the present invention, in which the adder/subtracter circuit 30 and memory 31 is commonly used.

FIG. 8 shows the circuit thereof. The sign bit of last shift output of the shift register 26, namely, the output of the shift register 26-0 is commonly connected to the first inputs of the exclusive OR gates 94 to 131. The data bit output is commonly connected to the first inputs of the AND gates 132 to 169. The sign bit outputs of the shift registers 26-395 to 26-46 are selectively applied to the second inputs of the exclusive logic OR gates 94 to 131 and the data bit outputs of the shift registers 26-395 to 26-46 are similarly added to the second inputs of the AND gates 132 to 169.

Figure 6:
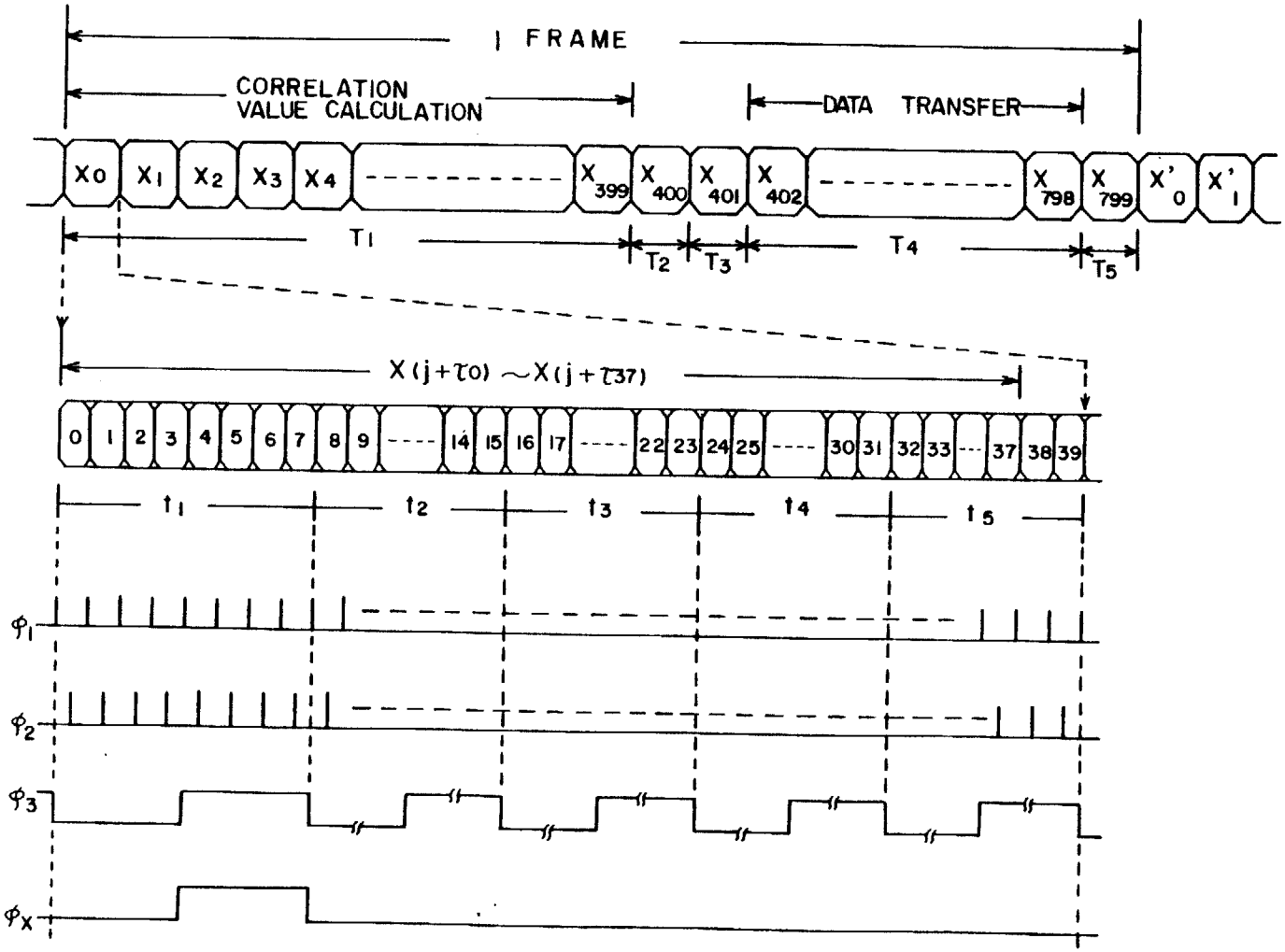
FIG. 6 shows a detailed timing chart of the embodiment of the present invention.

In the embodiment of FIG. 6, the data selectively selected within one shift clock is sequentially multiplied by the last shift output in the multiplier 28, and, in the embodiment shown in FIG. 7, they are multiplied in separate multiplier circuits. The outputs of the multiplication result are delivered in parallel from the AND gates 132 to 169 and the exclusive OR gates 94 to 131 in accordance with the respective time delays. The outputs are applied to clock input terminals C and the up and down selection terminals S of the up and down counters 170 to 207. The outputs of the counters are applied to a maximum value detection portion 32'.

In the embodiment of FIG. 7, all the outputs of the shift register steps 26-1 to 26-399 corresponding to the musical scales are applied to the multiplication circuit 28 and are respectively multiplied by the output of the shift register step 26-0. The outputs of the multiplications are applied to the up/down counters corresponding to the delay times. The outputs of the exclusive logic OR gates 94-131 enter the up/down selection terminals S of the respective up/down counters 170-207. Therefore, assuming by way of example that the up/down counters count down when "1" is applied to the up/down selection terminals S and up when "0" is applied, they count up for the multiplied results of +1 and down for the multiplied results of −1. In addition, when the outputs are "0", they are not counted because no clock data is received. That is, the up/down counters 170-207 have their contents changed in correspondence with the shift clock intervals. When the operations of the up/down counters have been executed for a specified range, for example, for 1 frame, the outputs thereof become cumulative values. In other words, the up/down counters correspond to the adder/subtracter circuit 30 and the memory portion 31 in the embodiment of the present invention illustrated in FIGS. 2 and 7. The outputs of the up/down counters 170-207 enter the maximum value detector portion 32'. Unlike the foregoing maximum value detector portion 19 of the embodiment in FIG. 7, this detector portion 32' includes the function of the window processing circuit 29. Therefore, it multiplies the outputs of the up/down counters 170-207 by the coefficient relevant to the delay times or by window values and detects the maximum value of the results. Although, the embodiments of the present invention in FIG. 7 and FIG. 8 have employed the shift register 26 which shifts and stores the three-valued data outputs from the comparator portion 20 so as to deliver the data $x_j$ and $x(j+\tau_i)$ delayed by $\tau_i$ from predetermined bits, the shift register can be replaced with, for example, a RAM (random access memory). More specifically, the three-valued data items provided from the comparator portion 20 are successively written into the RAM in the number of 400 for 1 frame, and in reading out the data $x_j$ and $x(j+\tau_i)$, addresses $A_j$ and $A(j+\tau_i)$ in which they are stored are assigned, whereby the same output data as in the case of employing the shift register can be obtained. Essentially, the shift register etc. are not restrictive, but any circuit arrangement capable of providing the data $x_j$ and $x(j+\tau_i)$ may be adopted.

Figure 9:
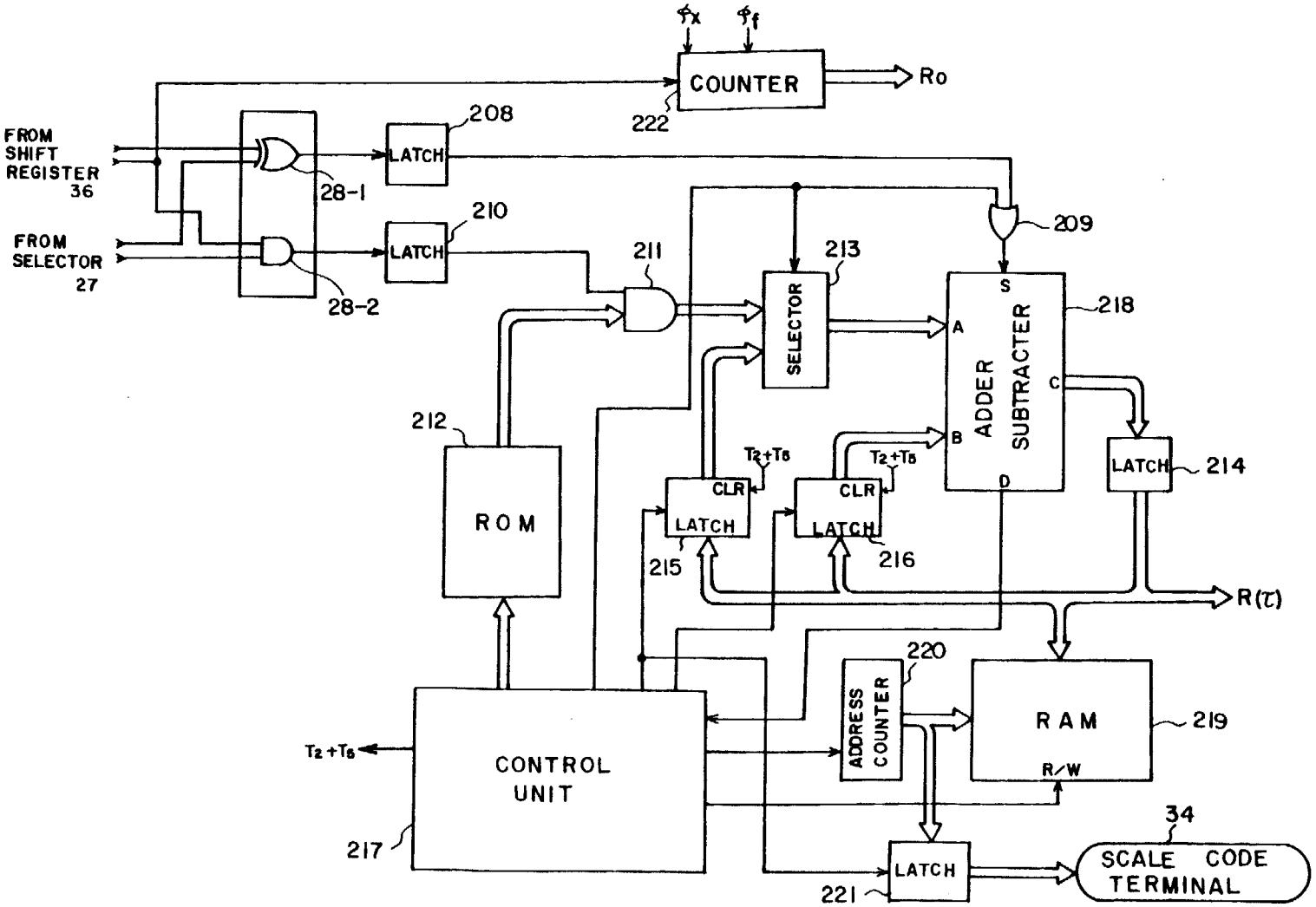
FIG. 9 shows a circuit diagram of the multiplication circuit 28, window process circuit 29, adder/subtracter circuit 30, memory 31 and maximum value detector 32 of FIG. 2.

FIG. 9 shows a circuit diagram of the multiplication circuit 28, window processing circuit 29, adder/subtracter circuit 30, memory portion 31, and maximum value detector 32. The output data of the shift register 26 and selector 27 is applied to the multiplication circuit 28. The multiplication circuit 15 is the same as shown in FIG. 7 and comprises the exclusive logic OR gate 28-1 and AND gate 28-2. The sign bit of said output data is applied to the exclusive logic OR gate 28-1 and the data bit is applied to the AND gate 28-2.

The output of the exclusive logic OR gate 28-1 is applied to the adder/subtracter control terminal of the adder/subtracter 218 through the latch circuit 208 and OR gate 209. The output of the AND gate 28-2 is supplied to the control terminal of a group of gate circuit 211 through the latch circuit 210. The signal for designating the window value of the control unit 217 is supplied to a read only memory ROM 212 and the output thereof is supplied to the first input of the selector 213 through a group of gate circuits. The output of the selector 213 is applied to the first input A of the adder/subtracter circuit 218. The output C of the adder/subtracter circuit 218 is supplied to the latch circuit 215 and 216 and a randam access memory (RAM). The output of the latch circuit 215 is added to the second input of the selector 215, and the output of the latch circuit 216 is applied to the second input B of the adder/subtracter circuit 218. The output of the address counter 220 is applied to the input of RAM 219 and is connected to the scale code terminal 34 through the latch circuit 221. The carry output D of the adder/subtracter 218 is connected to a control portion 217. A quantity comparison signal from the control portion 217 is supplied to the selector 213 and OR gate 209. The latch circuit is added to latch circuits 215, 216 and 221, a count clock is supplied to the address counter 220, and a read/write signal is applied to RAM 219. The data bit of the shift register 26 is applied to an enable terminal of a counter 222. A clock $\phi x$ is supplied to the count input of the counter 222 and a frame clock $\phi f$ is applied to the reset input thereof. The multiplier circuit 28 receives the last shift output of the shift register 26 and shift data selected by the selector 27. As described above, the multiplier circuit 28 comprises the exclusive logic OR gate 28-1 and AND gate 28-2, which receive a sign bit and data bit, respectively. A logic of the exclusive logic OR gate 28-1 coincides with a logic of a sign of a multiplication having a positive and negative bit. A logic of the AND gate 28-2 coincides with a logic of a multiplication of one bit data of no sign bit. Thus the multiplication of three-valued data is conducted by the exclusive logic OR gate 28-1 and AND gate 28-1. The result is stored in latch circuits 208 and 210. The latch circuit stores a multiplied result so that the multiplied result is not changed during the following window processing and it stores constant data until the next multiplied data is inputted thereto.

The ROM 212 stores window values therein. The window value corresponding to the correlative value multiplied by means of the multiplication circuit 28 is selected by the control portion 217, and is delivered from the ROM 212. In general, a correlative value obtained in relation to a time delay concerns the power of a frequency corresponding to a period equal to the delay time. Therefore, in case of a signal containing higher harmonics in large quantities, the correlative values of the higher harmonics become equivalent to or greater than the value of the fundamental wave. Since the correlative values are obtained for a plurality of delay times in the present invention, the higher harmonic wave might be mistaken for the fundamental wave in such case. To the end of preventing this drawback, the correlative value is multiplied by the window value. The window value is greater as the delay time is longer (the frequency is lower), by way of example. Now, the window value provided from the ROM 212 enters the corresponding gate circuit 211, which is turned "on" or "off" by the output data of the AND gate 28-2. More specifically, if the output of the AND gate 28-2 is the high level, the window value is applied to the first input of the selector 213 in order to add or subtract the value, and if the output is the low level, zero data is applied to the first input. At this time, the control terminal of the selector 213 and the OR gate 209 are supplied with the low level from the control portion 217. Thus, the selector 213 applies the output of the gate circuit 211 or the window value to the first input A of the adder/subtracter circuit 218. In addition, the OR gate 209 applies the sign data of the multiplication circuit 28 to the addition/subtracter control terminal S of the adder/subtracter circuit 218. Under this status under which the selector 213 selects the output of the gate circuit 211 and the addition/subtraction control terminal S of the adder/subtracter circuit 218 is supplied with the sign data, the window value and the value entering the input B of the adder/subtracter circuit 218 are added by this circuit 218 when the three-valued data is +1, and the window value is subtracted from the valve similarly entering the input B when the three-valued data is $-1$. On the other hand, when the data bit is zero, that is, when the three-valued data is zero, zero is delivered from the corresponding gate circuit 213, so that the output C of the adder/subtracter circuit 218 becomes the value having entered the input B. That is, the three-valued data (being the multiplied result) and the window value are multiplied, and then added in the adder/subtracter circuit 218 by such operation. At this time, the data of the RAM 219 assigned by the address counter 220 is applied to the input B of the adder/subtracter circuit 218 through the latch circuit 216. Since the data is the corresponding cumulative data inputted up to that point, of the results of multiplications of the multiplication circuit 28 between the three-valued data and the window values, the output of the adder/subtracter circuit 218 becomes a cumulated result with the new product added. The result is stored in the latch circuit 214, and is also stored in the memory area of that address of the RAM 219 which is assigned by the address counter 220, and which is the same as the address before the addition of the new product or multiplied result.

The data bit of the output of the shift register 26 is applied to the enable terminal of the counter 222, and the clock $\phi_x$ is applied to the count input thereof each time the data is shifted. Therefore, when the data is $+1$ or $-1$, the counter 222 counts up. On the other hand, the counter 222 is cleared by the frame clock $\phi_f$. Accordingly, the content of the counter 222 is equivalent to the power of the three-value quantization data during 1 frame. The output $R_0$ of the counter 222 is used as data for generating a flag indicative of the presence or absence of a sound to be described later.

Further, the above operation will be explained with reference to a data chart within 1 frame shown in FIG. 6. The correlative values in the embodiment of the present invention are found in frame unit. One frame consists of 800 data, $X_0$–$X_{799}$ in all, and the correlative values are computed in the preceding part $X_0$–$X_{399}$ (period $T_1$) of the frame. Before the period $T_1$ or in a period $T_5$ of the preceding frame, the contents of the RAM 219 are cleared by a circuit not shown. In addition, the data items $x(0+\tau_0)-x(0+\tau_{37})$ of the specified delay times at the data $X_0$ are successively multiplied by means of the multiplication circuit 28. Further, the respective window values corresponding to the multiplications, in other words, corresponding to the delay times, are delivered from the ROM 212 in succession. At this time, the contents of the RAM 219 corresponding to the delay times are successively selected by the address counter 220. The two kinds of data are calculated in the adder/subtracter circuit 218 by the operation described before, and the calculated results are finally stored in the RAM 219. The address counter 220 has count contents 0–37 corresponding to $\tau_0$–$\tau_{37}$, of which the circuit is made at the data $X_0$ and further each of the data $X_1$–$X_{399}$. That is, the address counter 220 repeats the counting of 0–37 four hundred times within 1 frame. Thus, the delay data $x(j+\tau_0)-x(j+\tau_{37})$ of the respective data $X_0$–$X_{399}$ are multiplied, and the results are further multiplied by the window values and then cumulated. Consequently, the cumulated results corresponding to the specified delay times $\tau_0$–$\tau_{37}$, in other words, the correlative values $R'(\tau_i)$ indicated in the foregoing equation (2), namely, the correlative values subjected to the window processing, are stored as the contents of the respective addresses of the RAM 219.

In the operation mentioned above, the control portion 217 accesses the addresses of the ROM 212 storing the window values. Since, however, the address correspond to the counts of the address counter 220, a similar operation is effected by applying the counts to the ROM 212. Further, such operations as the storing operations of the latch circuits 215, 216 and the RAM 219 are controlled in synchronism with clock pulse trains $\phi_1$ and $\phi_2$ shown in FIG. 6.

The circuit arrangement of FIG. 9 further has the function of finding the maximum value of the correlative values corresponding to the respective delay times. Now, the operation will be described.

First, the latch circuits 215 and 216 are cleared in a period $T_2$. Since the correlative values corresponding to the respective delay times obtained in the period $T_1$ shown in FIG. 6 have been stored in the RAM 219, the correlative value corresponding to $\tau_0$ is addressed by the address counter 220 and is stored in the latch circuit 216.

Since, on this occasion, the selection terminal of the selector 213 is supplied with the high level of the selection signal, the selector 213 selects the output of the latch circuit 215. Further, since one input of the OR gate 209 is supplied with the high level of the selection signal, the output thereof becomes the high level. That is, the addition/subtraction control terminal S of the adder/subtracter 218 is supplied with the high level, so that the adder/subtracter circuit executes the subtraction operation.

As stated above, the latch circuit 216 first stores the data corresponding to $\tau_0$. Therefore, the adder/subtracter circuit 218 subtracts the value from data stored in the latch circuit 215. At this time, the latch circuit 215 is immediately after having been reset. Therefore, zero is stored, and a carry is provided from the carry terminal D. Upon receiving the carry signal, the control portion 217 makes control so that the content of the address of the RAM 219 assigned by the address counter 220, namely, the correlative value corresponding to $\tau_0$ at this time may be stored in the latch circuit 215. Since zero has been stored in the latch circuit 215 at the initial stage, the correlative value corresponding to $\tau_0$ is stored in the latch circuit 215 without fail. On this occasion, the count value of the address counter 220 is also stored in the latch circuit 221. The address counter 220 is subsequently incremented by the next clock pulse of, e.g., the train $\phi_1$, so as to access the next address of the RAM 219 in which the correlative value of $\tau_1$ is stored. Thus, the RAM 219 provides the correlative value of $\tau_1$, and the latch circuit 216 stores this data in accordance with the clock produced from the control portion 217. Similar to the foregoing, the content of the latch circuit 216 is subtracted from that of the latch circuit 215 by the adder/subtracter circuit 218. Herein, in a case where the result is minus, that is, where the carry terminal D of the circuit 218 has delivered the carry, the content of the latch circuit 216 is greater than that of the latch circuit 215. Therefore, the content of the latch circuit 216 or the data provided from the RAM 219 is stored in the latch circuit 215, and the value of the address counter 220 is then stored in the latch circuit 221. These storing operations are executed in accordance with the latch signal produced from the control portion 217. Conversely, in a case where the content of the latch circuit 216 is smaller than that of the latch circuit 215, no carry is delivered form the carry terminal D. Therefore, the latch signal is not provided from the control portion 217, and the content of the latch circuit 215 undergoes no change. Although the result of the adder/subtracter circuit 218 is provided, the data merely enters the latch circuit 214 and is not delivered therefrom. Since such operations are successively executed for $\tau_0$–$\tau_{37}$, the maximum value of the correlative values corresponding to the delay times is finally stored in the latch circuit 215. In this way, the maximum value of the contents of the RAM 219 is detected. Concurrently, the latch signal pulses entering the latch circuit 215 are also applied to the latch circuit 221 in the successive operations for $\tau_0$–$\tau_{37}$. Finally, the address of the RAM 219 corresponding to the maximum value stored in the latch circuit 221 is latched in the latch circuit 221. Since the address value corresponds to the correlative value having the maximum value, it is delivered from the musical scale code terminal 34 as the code data of the maximum correlative value. The delivery of the code data is done in a period $T_4$.

The window processing and cumulation, and the detection of the maximum value of the cumulated results are executed in frame units in successive fashion. In consequence, the result of the pitch extraction in the voice during 1 frame time, namely, during the periods $T_1$–$T_5$ is coded and delivered as the output. This output is the output of the pitch extraction unit 3, and it is stored in the latch 4 of the succeeding stage and is subjected to the next processing.

Figure 10:
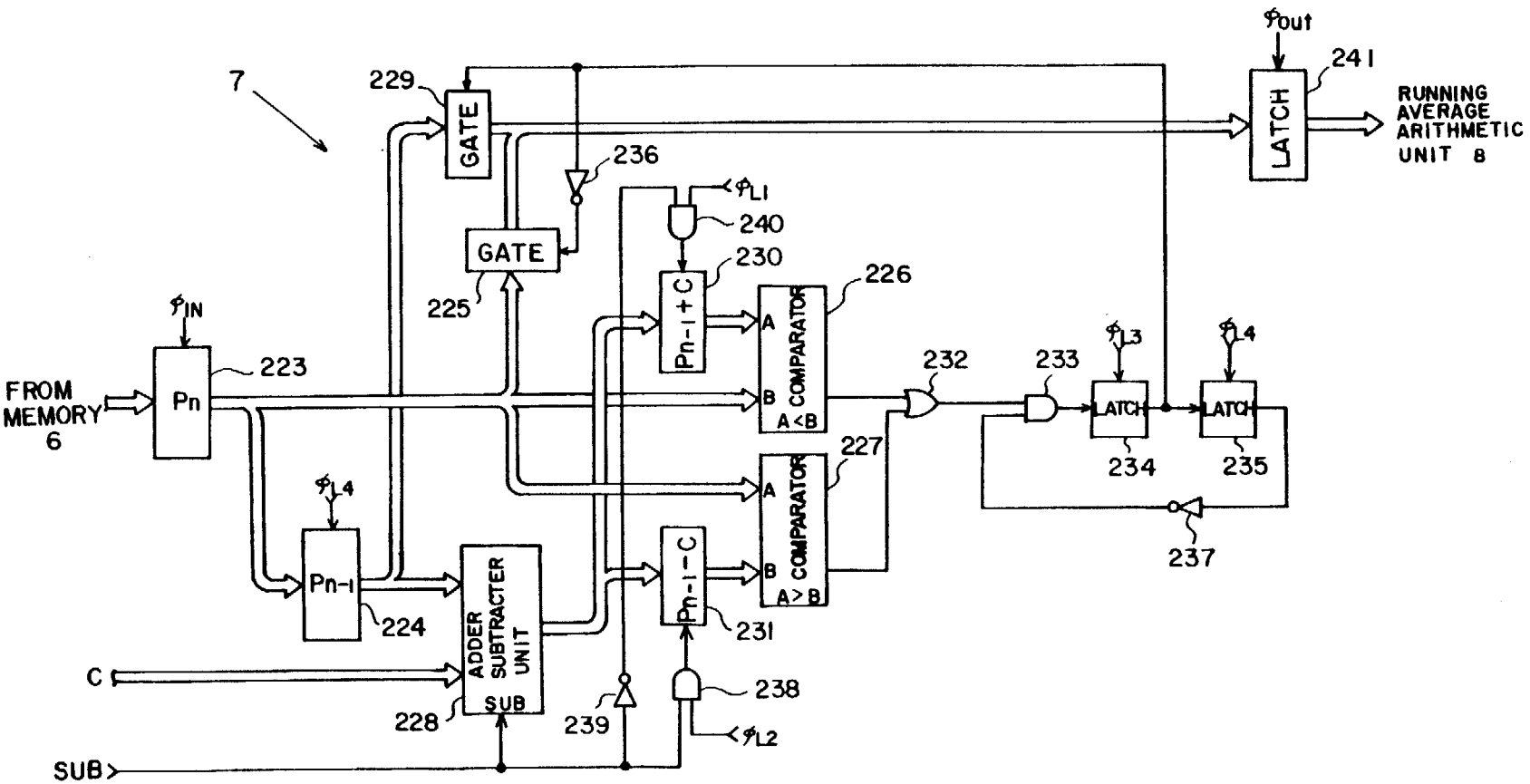
FIG. 10 represents a detailed circuit diagram of an embodiment of the error elimination unit 7 of FIG. 1.

FIG. 10 shows a detailed circuit diagram of the error elimination unit of FIG. 1.

The error elimination circuit is described below in detail.

The output of the memory unit 6 is applied to a latch circuit 224, gate 225, a B input of a comparator 226, and an A in put of a comparator 227. The output of the latch circuit 224 is connected to an adder/subtracter circuit 228 and a gate circuit 229. The output of the adder/subtracter circuit 228 is applied to an A input of a comparator 226 and a B input of a comparator 227, through latch circuits 230 and 231, respectively. The comparison outputs of the comparators 226 and 227 are applied to an OR gate 232. The output of the OR gate 232 is applied to the first input of an AND gate 233. The output of the AND gate is applied to a latch circuit 234. The output of the latch circuit 234 is applied to a latch 235 and gate 229, and is also applied to the gate circuit 224. The output of the latch circuit 235 is applied to the second input of an AND gate 233 through an inverter 237. The constant data C produced by a processor 5 (FIG. 1) is applied to one of the inputs of an adder/subtracter circuit 228. Furthermore, the control signal SUB is applied to the first gate of an AND gate 240 through the adder/subtracter circuit 228, the first input of the AND gate 238, and an inverter 239. Clocks $\phi_{L2}$ and $\phi_{L1}$ are applied, respectively, to the second inputs of the AND gates 238 and 240. The output thereof is applied to the latch circuits 231 and 230. The outputs of the gate circuits 229 and 225 are commonly connected and are applied to a circuit in the next stage, namely, the running average arithmetic unit 8 (FIG. 1). On the other hand, clocks $\phi_{IN}$, $\phi_{L3}$ and $\phi_{L4}$ are applied to the latch circuits 223, 234 and 235. A clock $\phi_{L4}$ is supplied to the latch circuit 224.

Figure 11:
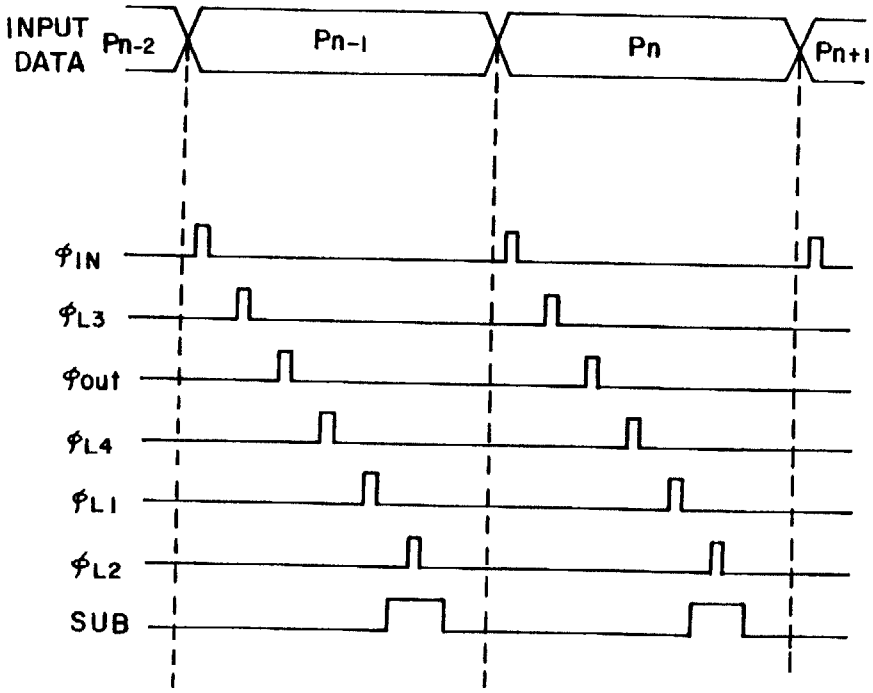
FIG. 11 is a timing chart of the embodiment of FIG. 10.

The concrete operation of the error elimination unit 7 constructed as described above, is described by referring to a timing chart of FIG. 11.

Assume that the frame of the operation be the (n−1)-th frame. At first, the pitch data $P_{n-1}$ of the (n−1)-th frame from the memory unit 6 (FIG. 1) is stored in the latch circuit 223 in accordance with the rise of the clock $\phi_{IN}$, and it is delivered to the B input of the comparator circuit 226 and the A input of the comparator circuit 227 in accordance with the fall of the clock $\phi_{IN}$. On the other hand, the A input of the comparator circuit 226 and the B input of the comparator circuit 227 have already been respectively supplied with values $P_{n-2}+C$ and $P_{n-2}-C$ obtained by adding and subtracting a constant C to and from the pitch data $P_{n-2}$ of the immediately preceding frame, namely, the (n−2)-th frame. The comparator circuit 226 compares if $P_{n-2}+C<P_{n-1}$ holds, while the comparator circuit 227 compares if $P_{n-2}-C>P_{n-1}$ holds. When the conditions are met, the comparator circuits 226 and 227 provide outputs of the low level. When either condition holds, that is, when $P_{n-1}$ lies outside the range of $P_{n-2}\pm C$, one of the comparator circuits 226 and 227 provides the output of the high level. As a result, the output of the OR gate 232 becomes the high level. Then, a high level signal is delivered through the AND gate 233. In the initial status, the latch circuit 235 is reset, and hence, its output is at the low level. Therefore, the inverter 237 is supplied with the low level, and its output becomes the high level. That is, the second input of the AND gate 233 is supplied with the high level. Accordingly, the AND gate 233 turns "on" to apply the output of the OR gate 232 to the latch circuit 234. If $P_{n-1}$ lies within the range of $P_{n-2}\pm C$, the output of the AND gate 233 becomes the low level. Subsequently, the signal of the AND gate 233 is fed to the latch circuit 234 in accordance with the rise of the closk $\phi_{L3}$, and the output of the latch circuit 234 appears in accordance with the fall of the clock $\phi_{L3}$.

Here, if $P_{n-1}$ lies within the range of $P_{n-2}\pm C$, the output of the latch circuit 234 becomes the low level to disable the gate circuit 229. In addition, since the inverter 236 is supplied with the low level, its output becomes the high level and enables the gate circuit 225. The input pitch data of the (n−1)-th frame as it is, is fed to the latch circuit 241 through the gate circuit 225 in accordance with the rise of the next clock $\phi_{OUT}$, and it is delivered to the circuit of the succeeding stage, namely, the running average calculation unit 8 in accordance with the fall of the clock $\phi_{OUT}$. This occasion is a case where the pitch data $P_{n-1}$ of the (n−1)-th frame lies within a specified range (±C) relative to the immediately preceding pitch data $P_{n-2}$ and where it has been judged correct pitch data.

Next, if $P_{n-1}$ lies outside the range of $P_{n-2}\pm C$, the output of the latch circuit 234 becomes the high level to disable the gate circuit 225 and to enable the gate circuit 229. The pitch data $P_{n-2}$ of the immediately preceding frame having been delivered from the latch circuit 224 in advance, is fed to the latch circuit 241 through the gate circuit 229 in accordance with the rise of the clock $\phi_{OUT}$, and is delivered to the circuit of the succeeding stage or the running average calculation unit 8 in accordance with the fall of the clock $\phi_{OUT}$. This is a case where the pitch data $P_{n-1}$ of the (n−1)-th frame differs greatly from the immediately preceding pitch data $P_{n-2}$. Herein, $P_{n-1}$ is neglected as abnormal pitch data, and the pitch data $P_{n-2}$ of the immediately preceding frame is delivered instead.

Subsequently, the output from the latch circuit 234 is fed to the latch circuit 235 in accordance with the rise of the clock $\phi_{L4}$, and the output of the latch circuit 235 is applied to the input of the AND gate 233 through the inverter 237 in accordance with the fall thereof. The latch circuit 235 serves to store if the pitch data $P_{n-1}$ of the (n−1)-th frame has been the normal value, and the low level of the content of this latch circuit indicates the normality and the high level the abnormality. Besides, the output $P_{n-1}$ from the latch circuit 223 enters the latch circuit 224 in accordance with the rise of the same clock $\phi_{L4}$, and the output of the latch circuit 224 enters the adder/subtracter circuit 228 in accordance with the fall thereof. Since the other input of the adder/subtracter circuit 228 is supplied with the constant value C, the addition is first conducted (the control signal SUB is at the low level).

Next, the result of the addition $P_{n-1}+C$ enters the latch circuit 230 in accordance with the rise of the clock $\phi_{L1}$, and the output of this latch circuit 230 appears in accordance with the fall thereof.

Subsequently, the control signal SUB of the adder/-subtracter circuit 228 becomes the high level, and the constant value C is subtracted from the output $P_{n-1}$ of the latch circuit 224. The result of the subtraction $P_{n-1}-C$ enters the latch circuit 231 in accordance with the rise of the clock $\phi_{L2}$, and the output of this latch circuit 231 appears in accordance with the fall thereof.

Then, the operations for 1 frame end, and the control shifts to the n-th frame. In the n-th frame, the pitch data $P_n$ of this frame is received in accordance with the clock $\phi$IN. It is compared in magnitude with the value $P_{n-1}\pm C$ previously computed in the (n−1)-th frame. The pitch data $P_{n-1}$ or $P_n$ based on the comparison is selectively delivered.

In the way thus far described, the pitch data which is greatly different from the pitch data of the preceding frame is eliminated as the abnormal data, and the pitch data of the preceding frame is delivered instead.

However, in a case where the musical scale changes suddenly and continuously, the error elimination is rather inconvenient. Therefore, in a case where the error elimination has been done in the preceding frame, it is not executed in the present-time frame. Now, when the error elimination has been done in the preceding frame, the output of the latch circuit 235 is the high level, so that one input to the AND gate 233 to be applied through the inverter 237 becomes the low level. Thus, the output of the latch circuit 234 becomes the low level without fail, and only the gate circuit 225 is selected, with the result that the error elimination is not executed. That is, in the event that the pitch data items have abruptly changed for 2 or more frames, the change is not deemed an error, and the error elimination is not done.

Figure 12:
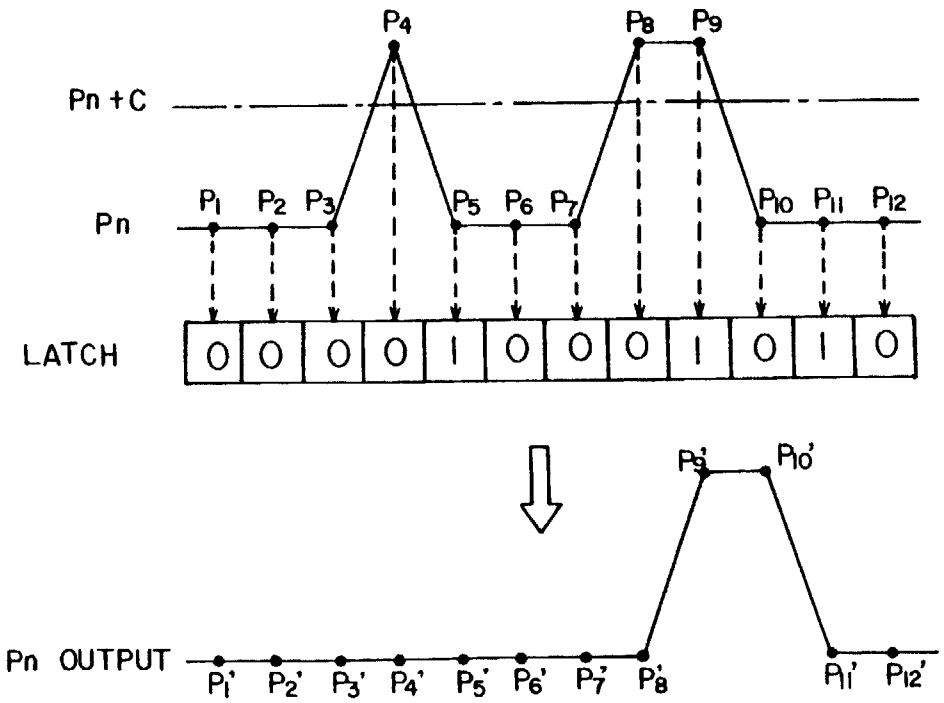
FIG. 12 is a diagram showing one example of the inputs of the pitch data and outputs of the latch circuit of the embodiment of FIG. 10.

FIG. 12 is a diagram showing examples of the inputs of the pitch data, and examples of the outputs of the error elimination unit 7 (the outputs of the latch circuit 241) and contents of the latch circuit 235, corresponding to the input examples. The pitch data $P_4$ of the fourth frame has a value greater than $P_3'+C$ where $P_3'$ denotes the output pitch data of the third frame. Besides, the error elimination has not been done in the third frame (the value of the latch circuit 235 in the third frame is "0"). Therefore, the input data $P_4$ is judged abnormal, and the output $P_4'$ of the fourth frame is rendered the same value as the value $P_3'$ of the third frame.

Likewise, the pitch data $P_8$ of the eighth frame is judged abnormal, and the output $P_8'$ thereof is rendered the same value as that $P_7'$ of the seventh frame. The pitch data $P_9$ of the ninth frame is also greater th $P_8'+C$ where $P_8'$ denotes the output of the eighth frame. In this case, however, the error elimination has been done in the eighth frame, and the value of the latch circuit 235 has become "1". Therefore, the input $P_9$ is not judged abnormal, and it is provided as the output $P_9'$ without being changed. Further, the input value $P_{10}$ of the tenth frame becomes smaller than $P_9'-C$ in relation to the output value $P_9'$ of the preceding ninth frame. Therefore, the input $P_{10}$ is judged abnormal again, and the output $P_{10}'$ becomes the same value as $P_9'$. Thereafter, the input value $P_{11}$ of the eleventh frame is smaller than $P_{10}'-C$ in relation to the output value $P_{10}'$ of the preceding tenth frame. Since, however, the value of the latch circuit 235 is "1", the error elimination is not done, and the data $P_{11}$ is delivered as $P_{11}'$ without being changed. In this manner, according to the error eliminator circuit of the present invention, the error of only one frame is properly eliminated, and in the case where the change has continued for at least two frames, it is not judged and error and it can be followed up with the response merely delayed by one frame as illustrated in FIG. 12.

Figure 13:
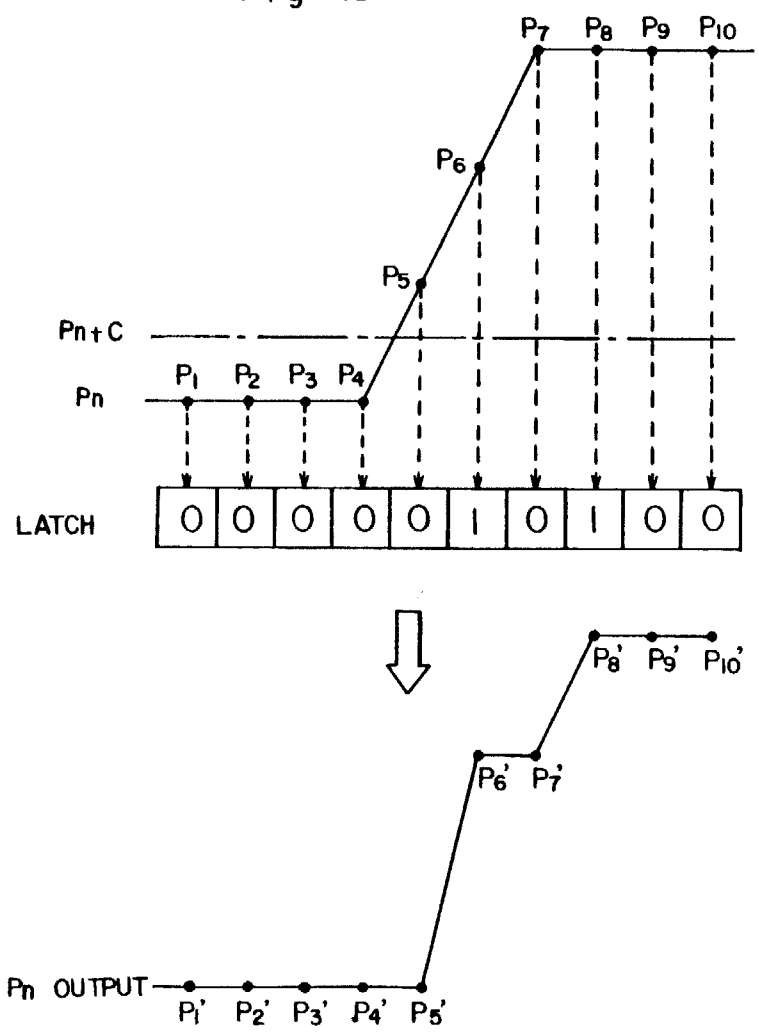
FIG. 13 shows a diagram of another example of the inputs of the pitch data and outputs of the latch circuit of the embodiment of FIG. 10.

FIG. 13 shows an example in which the pitch data abruptly changes from a low value to a high value. The operation is the same as described in FIG. 12. A step-shaped portion appears in the output at every two steps. The response follows fully only with one frame delay.

As described above, the error elimination portion 7 eliminates an error of one frame caused by an error of the pitch extraction and delivers a proper musical scale to the next stage.

In the above embodiment, the pitch data is numeric number sequentially assigned to musical scales. The present invention is not limited to it. Pitch data may be directly corresponding to the pitch. Further, the range in which pitch data may be compared with those of the previous frame is limited to a range of a constant number C. As a change in pitch upon producing voice and an error caused in a pitch extraction portion 3 are different depending on a higher frequency voice or a lower frequency voice, the value of the constant number C may be varied accordingly.

The data, the error of which is eliminated by the error elimination portion, is applied to the running average calculation unit and pitch data control unit.

Figure 14:
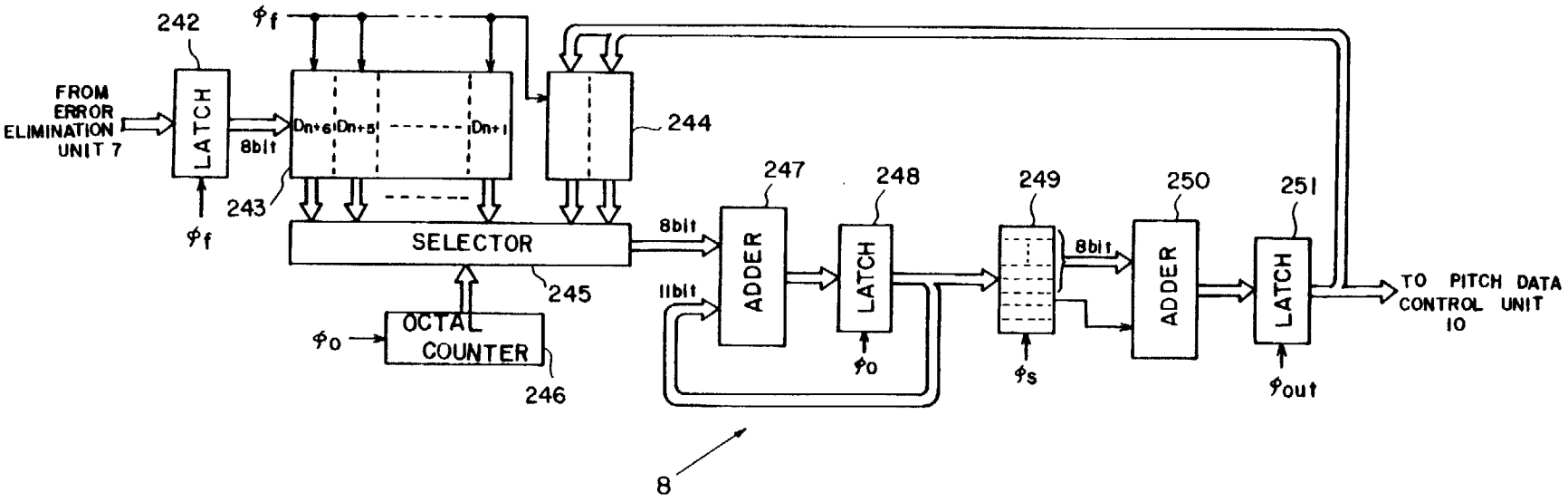
FIG. 14 shows a detailed block diagram of the running average calculation portion 8 of FIG. 1.

FIG. 14 shows a detailed block circuit of running average calculation portion 8 of FIG. 1. The running average calculation portions will be explained more in detail.

The output of the error elimination portion 7 is applied to a shift register 243 through a latch 242. The outputs of the shaft register 243 and latch 244 are applied to a selector 245. The output of an octal counter 246 to which a clock $\phi_0$ is applied is added to the selector 246. The output of the selector 245 is applied to the first input of the adder 247. The output of the adder 247 added to the second input of the adder 247. The output of the adder 247 is added to latch circuit 249 through the latch 248. The upper eight bit output of the latch circuit 249 is added to the first input of an adder 250. The ninth output of the latch circuit 289 is supplied to a carry input of an adder 250. The output of the adder 250 is applied to the latch 224 through a latch 251 and is outputted to a counter of the next stage, namely, the pitch data control portion 10.

The pitch data, the error of which is eliminated, for example, eight bit data, is stored in the latch circuit 242 as the data within one frame. The latch circuit 242 receives data at a running of a frame clock $\phi_f$ in order to process in frame units the data from which the error is deleted.

The shift register 243 performs a shifting of 8 bit parallel data at a timing of a frame clock $\phi_f$. The data stored in the latch circuit 242 is successively stored in the shift register 243 by every frame unit and, then, shifted. In other words, the shift register 243 memorizes six data previous to the present data.

On the other hand, the latch circuit 244 comprises paired latch circuits. The latch circuit 244 receives the same data as the output of the running average arithmetic unit 8 and the same data is stored in the paired latch circuits. The selector 245 sequentially selects six byte data stored in the shift register 243 and two byte data stored in the latch circuit 244 within one frame, thereby producing the output. This selection is instructed by the count value of an actual counter 246 which counts up by a clock $\phi_0$, the $\phi_0$ comprising eight blocks within one frame.

As the output of the adder 247 is applied to the second input thereof through the latch circuit 248, the output of the latch circuit 248 is considered as an output of a cumulating circuit for accumulating data applied to the first input of the adder 247 as a timing of $\phi_0$. As the latch circuit 248 is reset by a reset clock $\phi_R$ produced at the end of one frame, the accumulation operation is conducted by every one frame.

The content of the shift register 243 and the latch circuit 244 is applied to the first input of the adder 247 at a timing of $\phi_0$ through the selector 243. Thus, the accumulated output of the aforementioned cumulating circuit is equal to the sum of the data accumulated over six frames and twice data currently produced. Thus, the following equation is established.

$$Dx = \sum_{1}^{6} Dn + 1 + 2 \cdot Ds, \qquad (1)$$

where $Dn+1 \sim Dn+6$ are data stored in the shift register 243. Ds is data produced from the latch circuit 251 and Dx is the accumulated output of the aforementioned cumulating circuit.

This adder 247 cumulates the mean value weighted and the 6 data, to find the cumulative value for obtaining the new mean value. The data obtained by weighting the mean value up to now is used as the data for finding the new mean value corresponding to the next frame clock, for the following reason: It is sometimes the case that proximate musical scales, for example, "B" and "C" often arise in response to a voice "C" on account of an error of pitch extraction etc., resulting in the random deviations of data. The above measure is therefore adopted in order to fix the proximate data.

Since the data entering the first input of the adder 247 consists of 8 bits, the aforementioned cumulative output becomes 11-bit data. It is the succeeding latch circuit 249 and adder 250 that evaluate the output $D_x/8$. The latch circuit 249 stores the cumulative output, the more significant 8 bits of which are applied to the input of the adder 250. The 9th bit is applied to the carry input of the adder 259. The 9th bit is applied to the adder 250 for the reason that the less significant 3 bits of the 11 bits are not merely rounded off, but that the 9th bit is taken into account. More specifically, when the 9th bit is "1", "1" is added to the data of the more significant 8 bits to form the average output, and when the 9th bit is "0", "1" is not added, and the less significant 3 bits are rounded off to provide the output. The latch circuit 249 and adder 250 are the circuits for delivering the mean value accurately, as stated above, and they are not needed when a high accuracy is not required.

The output of the adder 250 is stored in the latch circuit 251. This latch circuit 251 is a circuit for fixing the data during the next frame because its output is used in the succeeding stage and cumulation during the frame.

To sum up, the circuit arrangement in FIG. 14 further uses the mean value as part of the input data, thereby producing a hysteresis effect in the averaging operation and preventing the immediate response to the change of the less significant bits of the data.

Figure 15:
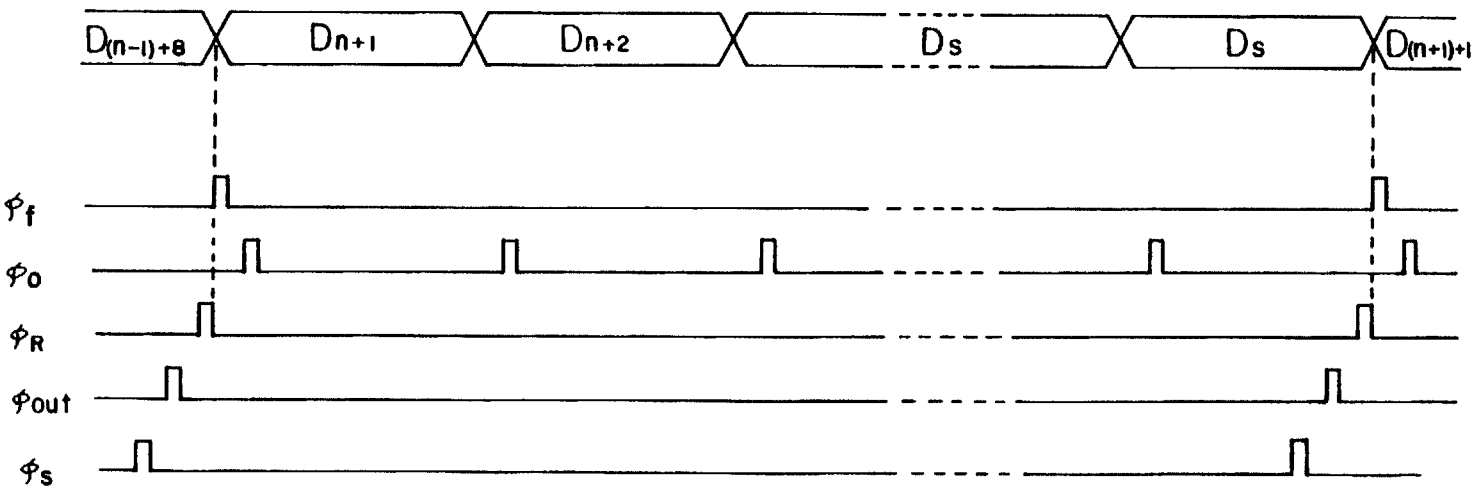
FIG. 15 is a timing chart of the running average unit of FIG. 14.

FIG. 15 is a timing chart showing the timing clock pulse trains of the running average calculation unit 8. Referring to this timing chart, the operations of the circuit arrangement in FIG. 14 will be further explained. The frame clock $\phi_f$ generates a clock at the beginning of 1 frame, and stores and shifts data as required. In FIG. 14, the latch circuits 242, 244 and the shift register 243 operate in accordance with this clock. Upon the generation of this clock, the stored data items of the latches etc. are fixed for 1 frame. Next, the clock pulse $\phi_0$ are successively produced in the number of 8 during 1 frame. These clock pulses increment the octal counter 246 so as to successively select the 8 input data within 1 frame by means of the selector 245. Further, the clock $\phi_0$ serves for the cumulation. More specifically, in accordance with the rise of the clock pulse $\phi_0$, the octal counter 246 is incremented to select data. The selected data is applied to the adder 247. At this time, the adder 247 is supplied with the addition data received up to this point, to which the select data is added or cumulated. In accordance with the fall of the clock pulse $\phi_0$, the latch 48 stores the resultant data. Such operations for the cumulation are executed 8 times during 1 frame. As described above, the cumulation is the addition between the past 6 data and double the mean value of the previous data. After the generation of the eighth clock pulse, a clock $\phi_1$ is produced, and the cumulative value is stored in the latch circuit 249. Almost simultaneously with the storage, the cumulative value is applied to the adder 250. This adder adds the value and the carry stated before, to provide the output. This output becomes the mean value. This processing is done before a clock $\phi_{OUT}$ to be subsequently generated, and the latch circuit 251 stores and delivers the mean value $N_8$(DS) in accordance with the clock $\phi_{OUT}$. The storage of the latch circuit 248 is reset by the clock $\phi_R$. This clock $\phi_R$ serves to execute the cumulation in frame unit.

Although the foregoing circuit arrangement has obtained the new mean value by cumulating the 6 data and double the previous mean value, the number of the data is not restricted to 6, and the multiple number of the previous mean value is not restricted to double, either. In this case of rendering the number of the data or the multiple number of the mean value different from that in the embodiment, a divider circuit corresponding to the different number is necessary.

Although not explained as to the running average calculation unit 8, the averaging of 4 frame data is also carried out. Likewise to the 8-frame running average value $N_8$, the average value $N_4$ of the 4 frame data is applied to the pitch data control unit 10.

Figure 16:
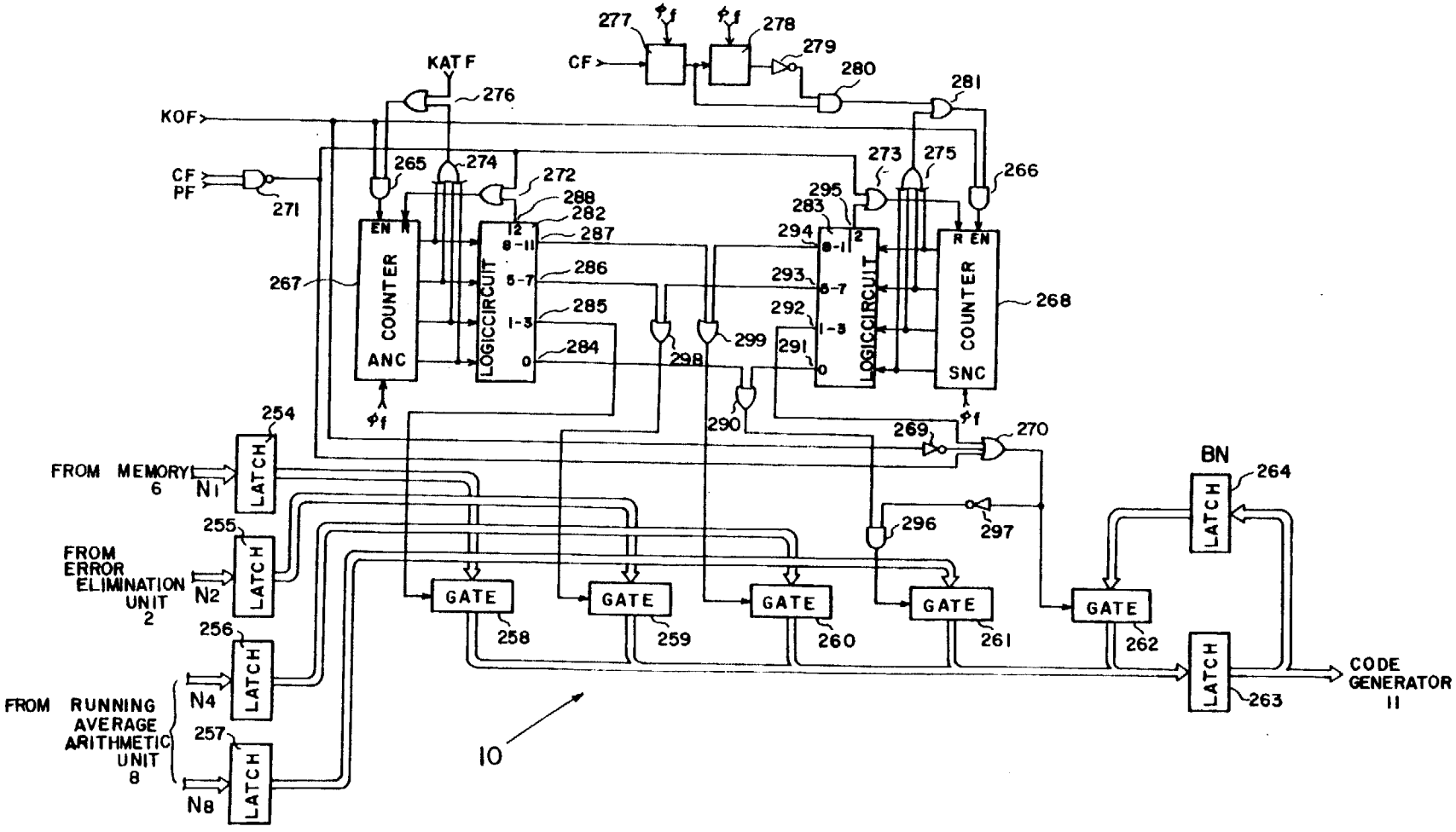
FIG. 16 represents a detailed block diagram of the pitch data control portion 10 of FIG. 1.

FIG. 16 shows a detailed block diagram of the pitch data control portion 10 of FIG. 1. The pitch data control portion 10 will be explained hereinafter.

Regarding the human voice, even when a specified pitch is to be produced, it is often astable at the beginning of vocalization, etc. Moreover, as stated before, the part of consonants etc. frequently lead to erroneous extractions because of unclear pitches.

On the other hand, the running average output with the hysteresis in the running average calculation unit 8 is effective for stabilizing pitch data on a steady musical scale, but is ineffective for a beginning part of great change. The output of the error elimination unit 7 can properly eliminate the error of the pitch data of 1 frame and can also follow up the sudden change of a musical scale, but it cannot follow up the unsteady change of the head part of the voice. Further, the 4-frame running average output in the running average calculation unit 8 has a property intermediate between the two outputs mentioned above. The unprocessed pitch data from the memory unit 6 is directly delivered to the code generator 11 in e.g., the initial 1st–3rd frames after the starting of vocalization. In the next 4th–7th frames, the pitch data is delivered through the error elimination unit 7. In the still next 8th–11th frames, the 4-frame running average output from the running average calculation unit 8 is provided. In and the 12th frame, the hysteretic 8-frame running average output of the calculation unit 8 is provided. In this way, as the beginning of the vocalization shifts to the steady part, the pitch data properly processed is selectively delivered to the code generator 11.

In case of producing sounds "do-so", by way of example in the human vocalization, when the steady part of "do" shifts to "so", a consonant exists in the initial part of "so", and hence, the pitch data sometimes interrupted in that part. However, when musical sounds are actually produced as "do-so", "do" and "so" should ideally be smoothly continuous without interruption. Therefore, when the consonant part has been detected, the pitch data immediately preceding the consonant part is continuously delivered for the detected part and vowel parts of 1–3 frames continuous thereto. In the subsequent 4–7 frames, the pitches might be interrupted in a consonant part to incur a great change in the pitches, and hence, the pitch data items from the respective processing portions are selectively delivered to the code generator 11 similarly to the foregoing processing for the initial part of the vocalization.

In order to realize the above operation with the pitch data control unit 10, various flags are prepared in the flag preparation unit 9 (FIG. 1). The flags to be prepared consist of a power flag PF, voice "presence" or "absence" flag CF, key-on flag KOF, key attack flag KATF and key-off flat KOFF. First, the power flag PF will be described.

Besides the pitch data, the power of the voice data of each frame (the output of the power extraction terminal 24 in FIG. 2) is delivered from the pitch extraction unit 3 to the processor 5 through the latch 4. When the value of the power has exceeded a certain threshold value, the power flag PF becomes the high level. This power flag PF serves as the indicator of the presence of a voice, regardless of whether it is consonant or a vowel.

Further, the processor 5 is supplied with the output $R_0$ of the counter 222 shown in FIG. 9. This output data is the cumulative value of the absolute values of the three-value quantization data during one frame. When the output $R_0$ has exceeded a certain threshold value, the voice "presence" or "absence" flag CF becomes high level. The voice "presence" or "absence" flag CF indicates the degree of the presence of a pitch. This flag CF becomes high level for a vowel sound etc., but it becomes a low level for a consonant sound or no sound. Since the voice "presence" or "absence" flag CF is a barometer expressing whether or not the correlative value is valid, the use of the maximum correlative value found is also allowed.

The key-on flag KOF is the flag showing that the musical instrument is in a state of producing sound. The key-on flag KOF turns to a high-level when both the power flag PF and the correlative value flag CF are in the high level. The key-on flag KOF turns to a low level when both the power flag PF and the correlative value flag CF are in the low level. In other situations than the above, it does not change. A key attack flag KATF becomes high level only during the first one clock in which the key-on flag KOF turns to the high level. The key-off flag KOFF becomes high level only during the first one clock in which the key-on flag KOF becomes low level.

These two flags are used as an index for indicating the beginning and end of the sound production. The operation of forming two flags is performed in every frame and is synchronized with a frame clock $\phi_f$ having a time width of a frame interval.

It is determined by using five flags above described whether it is a frame of voice start, a frame of consonant or a frame of voice end. The frame of voice start is a frame in which the key attack flag KATF is in the high level, and the frame of voice end is a frame immediately prior to a timing at which the key-off flag KOFF becomes a high level. The consonant frame is the frame in which both the power flag PF and key-on flag KOF are in the high level and the voice "presence" or "absence" flag CF is in the low level. In order to perform the pitch data control operation based on the above-mentioned flags, the pitch control unit 10 uses a counter (ANC) 267 for counting eleven frames from the frame of voice start and a counter (SNC) 268 for counting the eleven frames from the frame following to the consonant frame.

Thus, pitch data $N_1$ which is not yet processed is transmitted from the memory portion 6 (FIG. 1) to a latch circuit 263 through a latch circuit 254 and gate circuit 253. Pitch data $N_2$ is transmitted from the error elimination portion 7 (FIG. 1) to the latch circuit 263 through a latch circuit 255 and gate circuit 259. Average output pitch data $N_4$ outputted from the running average arithmetic unit 8 is supplied to the latch circuit 263 through a latch circuit 256 and gate circuit 260. The running average output with hystereis, namely, running average pitch data $N_8$, is supplied from the running average arithmetic unit 8 to the latch circuit 263 through a latch circuit 257 and a gate circuit 261. The output of the latch circuit 263 is delivered to the code generator 11 (FIG. 1) and is fed back to its own input through a latch circuit 264 and gate 262. The key-on flag KOF from the flag formation unit 9 (FIG. 1) is supplied to the count enabling input EN of the counters 267 and 268 through AND gates, respectively. Further more, the signal KOF is applied to an OR gate 270 through an inverter 269. The power flag PF and voice "presence" or "absence" flag CF from the flag formation portion 9 are applied to a NAND gate 271 and the output thereof is supplied to the count reset input R of the counters 267 and 268 and to an OR gate 270. The key-attack flag KATF from the flag formation portion 9 and the respective bit outputs delivered from the counter 267 through the OR gate 274 are applied to a count enabling input EN of the counter 267 through the AND gate 265 through an OR gate 276 and AND gate 265. The voice "presence" or "absence" flag CF from the flag formation unit 9 is supplied to a latch circuit 277 operating in accordance with the frame clock $\phi_f$ and the output of the latch circuit 277 is added to a latch circuit 278. The output of the latch circuit 277 and the output of the latch circuit 278 through an inverter 270 are applied to an AND gate 280. The output of the AND gate 280 and the respective bit outputs of the counter 268 through an OR gate 275 are added to the count enable input EN of the counter 268 through an OR gate 281 and AND gate 266. The counters 267 and 268 perform a count in accordance with the frame clock $\phi_f$ and the respective bit outputs thereof are added to logic circuits 282 and 283. The outputs 284 and 291 which become high level when the count is zero, are commonly supplied to the gate 261 through an OR gate 290 and one input of an AND gate 296. The other input of the AND gate 296 receives an output of the OR gate 270 through an inverter 297. The output 285 of the logic circuit 283 which becomes high level when the count is one to three controls the gate circuit 258 and the output 292 of the logic circuit 283 which becomes high level when the count is one to three is added to the OR gate 270. The respective outputs 286 and 293 of the logic circuits 282 and 283 which become high level when the count is four to seven control the gate circuit 259 through an OR gate 298. The respective outputs 287 and 294 of the logic circuits 282 and 283 which become high level when the count is eight to eleven control the gate 260 through an OR gate 299. The respective outputs 288 and 295 which become high level when the count is twelve are respectively supplied to the reset inputs R of the counters 267 and 268 through the OR gates 272 and 268 through the OR gates 272 and 273. The output of the OR gate 270 controls the gate circuit 262.

The operation of the pitch data control in the pitch control unit 10 as constructed above will be explained by referring to FIG. 17.

Figure 17:
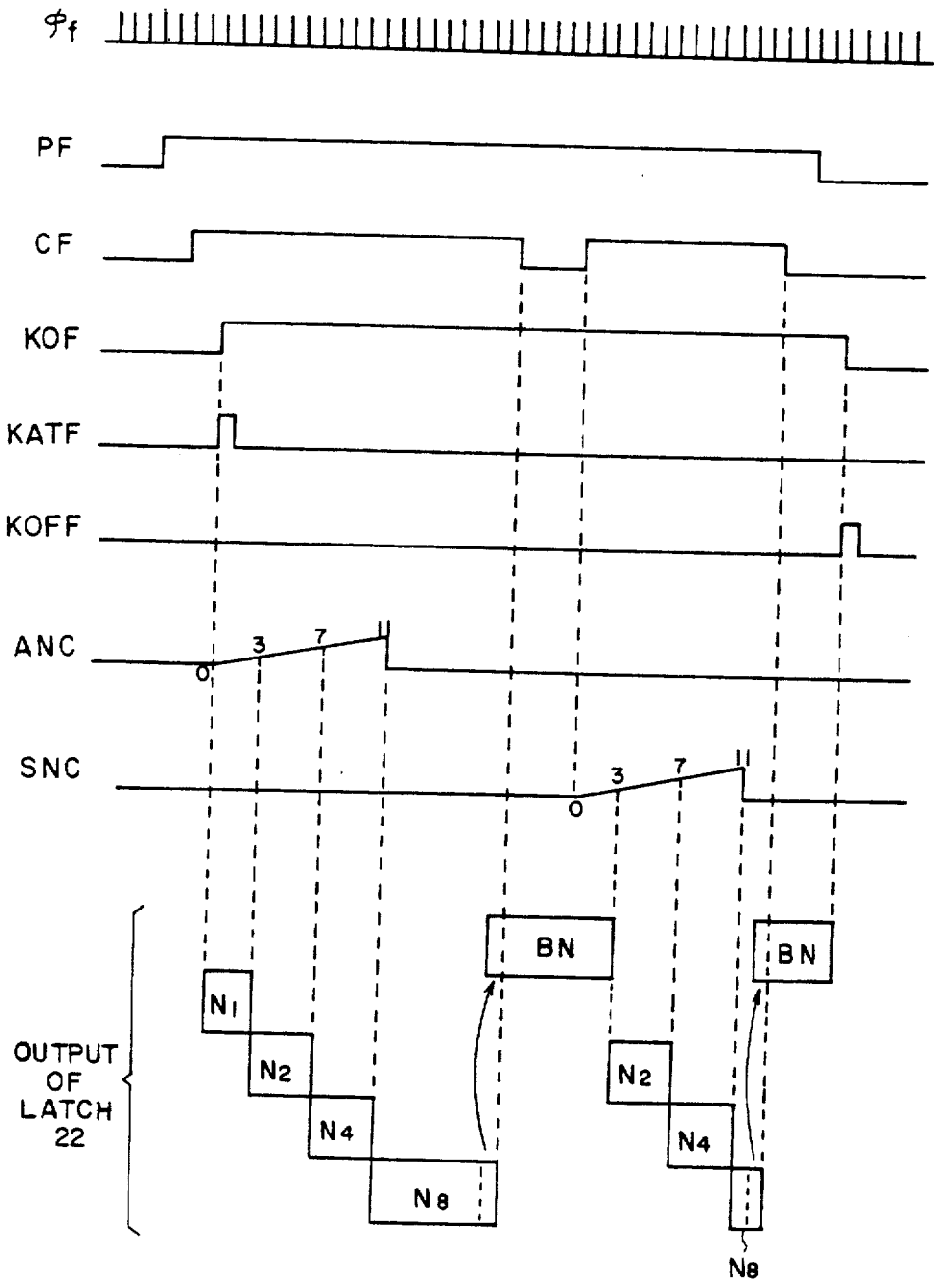
FIG. 17 shows a timing chart of the relationship of the respective flags and pitch data items in FIG. 16.

FIG. 17 is a timing chart showing the relationships between the respective flags and the pitch data items which are delivered from the two counters 267 and 268 and the pitch data control unit 10 to the code generator 11. First, when a voice has been received, the power flag PF becomes high level. With a delay of 2 frames, the voice "presence" or "absence" flag CF becomes high level (the delay is attributed to the circuit arrangement). With the subsequent delay of 2 frames, the key-on flag KOF becomes high level, while at the same time the key attack flag KATF becomes high level for 1 frame. Subject to the condition that the flag KATF has become high level and that all the flags KOF, PF and CF are high level, the counter 267 starts counting. This condition is held in such a manner that the count enable input EN of the counter 267 becomes high level through the OR gate 276 and the AND gate 265. When the counting has been started, the flag KATF becomes low level. Since, however, at least one of the 4 bits of the output of the counter 267 becomes high level, the output of the OR gate 274 becomes high level and the count enable input EN becomes high level through the OR gate 276 as well as the AND gate 265, so that the counter 267 continues the counting. Owing to the counting operation, extraction data items are continuously selected and delivered as outputs.

Next, when the count value of the counter 267 is 1 to 3, the gate 258 is opened, and the pitch data $N_1$ which is transmitted from the memory unit 6 (FIG. 1) without being processed is selectively supplied to the code generator 11 through the latch 263. The operation can be performed when the output 285 of the logic circuit 282 is in high level. When the count value of the counter 267 is 4 to 7, the output 286 of the logic circuit 282 is in high level, and the high level signal is added to the control terminal of the gate circuit 259 through the OR circuit 298, thereby causing the gate circuit 259 open, the pitch data $N_2$ delivered from the error elimination portion 7 to the latch circuit 255 is selectively supplied to the latch circuit 263. When the count values are 8 to 11, the gate 260 is opened, the four frame running average output $N_4$ delivered from the running average arithmetic portion 8 and stored in the latch circuit 256 is selectively supplied to the latch circuit 263. This operation is performed when the output 287 of the logic circuit 282 is in high level thereby causing the high level signal to be supplied to the control terminal of the gate circuit 260 through the OR gate 299.

When the count value of the counter becomes 12, the output 288 of the logic circuit 282 becomes high level, thereby causing the counter 267 to be elevated through the OR gate 272 and terminating the counting operation. Then, under the condition that the power flag PF, voice "presence" or "absense" flag CF and key-on flag KOF are commonly high, the gate circuit 261 is opened, and thus, the running average output delivered from the running average output $N_8$ with hysteresis function and stored in the latch circuit 257 is selectively delivered to the latch circuit 263. This operation can be performed when the output 284 of the logic circuit 282 and the signal transmitted through the NAND gate 271, OR gate 270 and inverter 297 are in high level, thereby causing the output of the AND gate 296 to be high level and to be applied to the control terminal of the gate circuit 261.

Where the consonant frame is detected in a key-on state (the key-on flag KOF is high), namely, the power flag PF is in high level and the voice "presence" or "absence" flag CF is low, the gate circuit 262 is opened, and the pitch data BN of the immediately preceding frame stored in the latch circuit 264 is selectively transmitted to the latch circuit 263. The pitch data BN is $N_8$ in FIG. 17. This operation can be achieved by causing the output of the NAND circuit 271 and OR circuit 270 to be high level thereby applying the high level signal to the control terminal of the gate circuit 262. When the consonant frame terminates and the next voice production frame initiates, the counter 268 starts its counting operation. When the "presence" or "absence" flag rises to a high level during the period of the high key-on flag KOF, the counter 268 starts the counting operation. This operation can be achieved by supplying a pulse signal to a count enable input EN of the counter 268 through the latches 277 and 298, AND circuit 280, OR gate 281 and AND gate 281.

When the count starts, the count enable input EN becomes a high level through an OR gates 275, and 281 and AND gate 266, thereby causing the count to continue.

When the count value is 1 to 3, the pitch data BN of the consonant frame continue to be supplied to the latch circuit 262. This operation can be achieved by causing the output 292 of the logic circuit 283 to be in the high level, thereby opening the gate 262 through the OR gate 270.

When the count value of the counter 268 is 4 to 7, the gate 259 is opened as in the counter 267, the pitch data $N_2$ is selectively supplied to the latch circuit 263. This operation can be achieved by causing the output 293 of the logic circuit 283 to be in the high level, thereby opening the gate circuit 259.

Further when the count value of the counter 268 is 8 to 11, the gate circuit 260 is opened as in the counter 267, thereby selectively applying the pitch data $N_4$ to the latch circuit 263. This operation can be achieved by causing the output 294 of the logic circuit 283 to be in the high level, thereby opening the gate circuit 260. In the frame in which the count value exceeds 11, the output 295 of the logic circuit 283 clears the counter 268, thereby causing the counting operation to end. Thereafter, the gate circuit 261 is opened, thereby causing the pitch data $N_8$ to be selectively applied to the latch circuit 263. This operation can be achieved by causing the output 291 of the logic circuit 283 to be in the high level, thereby opening the gate circuit 261.

The vocalization might continue unstably until, in the last part of the vocalization, the flag CF and then the flag PF become low level and the flag KOF becomes low level with a delay of 2 frames. Therefore, the gate circuit 262 is enabled, and the pitch data BN of the immediately preceding frame ($N_8$ in the case of FIG. 17) is similarly delivered to the latch circuit 263 selectively.

This operation is realized by enabling the gate circuit 262 through the NAND gate 271 as well as the OR gate 270.

FIG. 18 collectively indicates the relationships between the count values of the counters 267 and 268 and the sorts of pitch data to be selected. When the count values of the respective counters are 1–3, the unprocessed pitch data $N_1$ is selected in the counter 267 because of the starting of the vocalization, while the pitch data BN of the frame directly preceding a consonant is selected in the counter 268 because of the frame succeeding the consonant.

Further, as regards the count values 4–7 and 8–11 in the initial part of the vocalization, the unprocessed pitch data, the pitch data obtained by executing the error elimination of 1 frame, the pitch data obtained by taking the running average of 4 frames, and the pitch data obtained by taking the hysteretic 8-frame running average are selectively adopted in the order mentioned. Therefore, the pitch data of slight erroneous extraction can be supplied to the code generator 11 for both the unsteady change and the steady part. Moreover, the pitch data items are smoothly connected without interruption in the consonant part and the end part of the vocalization, so that the change of the musical scales to be produced in the code generator 11 becomes natural. In the embodiment of the present invention, the "off" of the voice "presence" or "absence" flag CF has been set at the consonant part. However, it is not restricted to the consonant part, but the change of musical scales produced from a musical instrument, for example, also corresponds thereto.

As described above, the present invention provides an electronic musical instrument in which the musical sound can be produced in accordance with the voice input. The electronic musical instrument of the present invention can be firstly achieved by the three value quantization circuit in which stable three value data can be obtained by changing the threshold level in accordance with the input level of voice, secondly by the pitch extraction processing circuit for extracting the pitch of the input voice on the basis of the time correlative value of three value data obtained by the three value quantization circuit, thirdly by the error elimination circuit for detecting and correcting the error in extracting the pitch data of the input voice, fourthly by the moving average arithmetic circuit for stabilizing unstable change of the input voice and fifthly by the pitch data control circuit for selecting the processed result in accordance with the power of the input voice.

Accordingly, the present invention can provide an electronic musical instrument in which an error is not produced even if a level of an input voice is changed, by performing a digital detecting and processing of the input voice signal with the result that the instrument can by easily performed by the voice of the performer who does not have a skill in operating the musical instrument.

It should be further noted that the electronic musical instrument of the present invention is suitable for LSI as the preprocess unit 2 and pitch extraction unit 3 can be formed in one chip.

What is claimed is:

1. An electronic musical instrument comprising:

a [microphone] *conversion means* for converting a [human voice] *musical sound* to an electrical signal;

analog-to-digital conversion means for converting said electrical signal to digital data corresponding to an amplitude value of the [human voice] *musical sound;* quantization means for quantizing said digital data outputted from said analog-to-digital conversion means, based on an amplitude value of the [human voice] *musical sound*, and for producing a digital quantization data signal; and pitch extraction means coupled to said quantization means for extracting pitch data of said digital quantization data obtained by said quantization means, and for producing an output corresponding to the extracted pitch data, thereby obtaining said pitch data as a function of an amplitude value of the [human voice] *musical sound;* processing means for processing the output of said pitch extraction means; and musical tone production means for receiving the output of said processing means and for producing a musical tone in accordance with said output of said processing means.

2. The electronic musical instrument according to claim 1, wherein said pitch extraction means includes means for obtaining the pitch of said digital quantization data based on a time correlation between said digital quantization data.

3. The electronic musical instrument according to claim 1 in which said quantization means comprises maximum and minimum value detecting means for detecting at least either the maximum value or the minimum value of the output of said analog-to-digital conversion means and threshold level output means for receiving the output of the maximum and minimum value detecting means for obtaining the threshold level therefrom; and said quantization means comprises means for receiving both the output of said analog-to-digital conversion means and threshold means.

4. The electronic musical instrument according to claim 3, in which said threshold level output means comprises a memory to an address of which the output of said maximum and minimum value detecting means is supplied, thereby delivering data as a threshold level from the output thereof.

5. The electronic musical instrument according to claim 3 in which said receiving means of said quantization means includes comparing means to which the output of said analog-to-digital conversion means and the output of said threshold level output means are applied.

6. The electronic musical instrument according to claim 5 in which said comparing means comprises a subtracting circuit for producing a carry output as a comparison output.

7. An electronic musical instrument comprising:

detection means for detecting a time position of at least an initial part of a [human voice] *musical* sound and a terminal part of said [human voice] *musical* sound, extraction means for extracting pitch data of said [voice] *musical sound.* a plurality of processing means for processing said such data is respective different manners, selection means for successively selecting processed pitch data of said plural processing means is correspondence with said detected time position, and musical tone production means for producing a musical tone on a basis of the processed pitch data derived from said selection means, said detection means comprising extraction change detection means for detecting that a change is output of said extraction means is more than a predetermined value, thereby obtaining said time position of at least said initial part of said [human voice] *musical* sound and said terminal part of said [human voice] *musical* sound.

8. The electronic musical instrument according to claim 7 in which said selecting means comprises a counter for starting a count from a time position immediately following either the timing position of a [voice] *musical sound* start or that obtained from said extraction change detection means, and means for selecting the processed pitch data in accordance with the count output from said counter.

9. The electronic musical instrument according to claim 7 in which said selecting means comprises means for continuously delivering that portion of the processed pitch data which immediately precedes a time position immediately following a [voice] *musical sound* end or that obtained from said extraction change detection means.

10. The electronic musical instrument according to claim 7 in which said plural processing means comprise means for eliminating an error from the extracted data and means for obtaining an average of said extracted data.

11. An electronic musical instrument comprising:

a [microphone] *conversion means* for converting a [human voice] *musical sound* to an electrical signal;

analog-to-digital [conversion] *converter* means coupled to said [microphone] *conversion means* for converting said electrical signal to digital data;

quantization means for quantizing the output of said analog-to-digital [conversion] *converter* means and for producing a digital quantization data signal, pitch extraction means coupled to said quantization means for extracting a pitch of said digital quantization data obtained by said quantization means, and for producing an output corresponding to the extracted pitch;

said pitch extraction means comprising:

a memory for delaying [voice] *musical sound* data[:];

a multiplication circuit for multiplying the delayed [voiced] *musical sound* data from said memory by data corresponding to a musical scale;

and an output control circuit for selectively applying first data stored in said memory and second data delayed by a predetermined time from said first data to said multiplication circuit;

processing means for producing the output of said pitch extraction means; and musical tone production means for receiving the output of said processing means and for producing a musical tone in accordance with said output of said processing means.

12. The electronic musical instrument according to claim 11 in which said pitch extraction means further comprises an accumulating circuit for accumulating and storing the output of said multiplying circuit.

13. The electronic musical instrument according to claim 11 in which said quantization data comprises two bit data having a sign bit and a data bit, and said multiplying circuit comprises an exclusive logic OR gate and AND gate, said sign bit being applied to the exclusive logic OR gate and said data bit being added to said AND gate.

14. An electronic musical instrument comprising:

a [microphone] *conversion means* for converting a [human voice] *musical sound* to an electrical signal;

analog-to-digital [conversion] *converter* means coupled to said [microphone] *conversion means* for converting said electrical signal to digital data;

quantization means for quantizing the output of said analog-to-digital [conversion] *converter* means and for producing a digital quantization data signal;

pitch extraction means coupled to said quantization means for extracting a pitch of said digital quantization data obtained by said quantization means, and for producing an output corresponding to the extracted pitch;

processing means for processing the output of said pitch extraction means; and musical tone production means for receiving the output of said processing means and for producing a musical tone in accordance with said output of said processing means;

said pitch extraction means having a three value correlation function processing apparatus comprising a multiplication circuit for multiplying three value data, a window value generator for producing a window value, a gate circuit having a control terminal for receiving a data bit of said multiplication circuit and an input terminal for receiving the window value of said window value generator, an adder/subtracter circuit having an adder/subtracter control terminal for receiving the sign bit of said multiplication circuit and a first input for receiving the output of said gate circuit, and a memory circuit for storing an arithmetic output of said adder/subtracter circuit to deliver it to a second input of the adder/subtracter circuit.

15. The electronic musical instrument according to claim 14 in which said window value generating circuit comprises a memory for storing the window value.

16. The electronic musical instrument according to claim 14 in which said multiplication circuit means comprises an exclusive logic OR gate and AND gate, an output of said exclusive logic OR gate operating as a sign bit and an output of said AND gate operating as a data bit.

17. The electronic musical instrument according to claim 14 in which said three value correlation function processing apparatus further comprises an address counter for delivering its output to an address terminal of said memory circuit.

18. An electronic musical instrument comprising:

a [microphone] *conversion means* for converting a [human voice] *musical sound* to an electrical signal;

analog-to-digital [conversion] *converter* means coupled to said [microphone] *conversion means* for converting said electrical signal to digital data;

quantization means for quantizing the output of said analog-to-digital [conversion] *converter* means and for producing a digital quantization data signal;

pitch extraction means coupled to said quantization means for extracting a pitch of said digital quantization data obtained by said quantization means, and for producing an output corresponding to the extracted pitch;

processing means for processing the output of said pitch extraction means, said processing means including:

an error eliminating means comprising memory means for storing past input data;

means for comparing said past input data stored in said memory means with present input data; and selecting means for selectively delivering said past input data or said present input data, said comparison means determining whether said present input data is within a predetermined range with regard to said past input data and selectively delivering either said past input data or said present input data; and musical tone production means for receiving the output of said processing means and for producing a musical tone in accordance with said output of said processing means.

19. The electronic musical instrument according to claim 18 in which said comparing means comprises an adder/subtracter circuit and a comparator, said adder/-subtracter circuit adding predetermined value to, or subtracting the predetermined value from, the past input data, and said comparator comparing said added result and subtracted result with the present input data.

20. The electronic musical instrument according to claim 18 in which said selecting means comprises a memory *said* selecting means selecting either one of the past input data and the present input data based on the content of said memory circuit.

21. An electronic musical instrument comprising:

a [microphone] *conversion means* for converting a [human voice] *musical sound* to an electrical signal;

analog-to-digital [conversion] *converter* means coupled to said [microphone] *conversion means* for converting said electrical signal to digital data;

quantization means for quantizing the output of said analog-to-digital [conversion] *converter* means and for producing a digital quantization data signal; and pitch extraction means coupled to said quantization means for extracting a pitch of said digital quantization data obtained by said quantization means, and for producing an output corresponding to the extracted pitch;

processing means for processing the output of said pitch extraction means; said processing means including:

a running average arithmetic means comprising memory means for storing the input data;

accumulation means for selecting data of said memory means and for accumulating said selected data; and average means for obtaining the average of the result of the accumulation by said accumulation means and selecting the output of said memory means and the output of said average means to accumulate them, thereby obtaining the average thereof; and musical tone production means for receiving the output of said processing means and for producing a musical tone in accordance with said output of said processing means.

22. The electronic musical instrument according to claim 21 in which said memory means comprises a shift register.

23. The electronic musical instrument according to claim 21 in which said accumulation means comprises a counter, selector and adder, said selector selecting the outputs of said memory and said output means in accordance with the content of said counter, and applying the selected data to a first input of said adder and supplying the output of said adder to a second input of said adder.

24. The electronic musical instrument according to claim 21 in which said average means includes a half adder, more significant plural bits of said accumulation means being added to the input of said adder and one bit following the more significant six bits being added to a carry input of said adder.

*25. An electronic musical instrument comprising:*

*conversion means for converting a musical sound to an electrical signal;*

*analog-to-digital converter means for converting said electrical signal to digital data corresponding to an amplitude value of the musical sound;*

*quantization means for quantizing said digital data outputted from said analog-to-digital converter means, based on an amplitude value of the musical sound, and for producing a digital quantization data signal;*

*pitch extraction means coupled to said quantization means for extracting pitch data from said digital quantization data signal, and for producing an output corresponding to the extracted pitch data; and*

*designating means coupled to said pitch extraction means for designating the pitch of a musical tone to be obtained based on the extracted pitch data.*

*26. An electronic musical instrument comprising:*

*conversion means for converting a musical sound having a pitch to a corresponding electrical signal;*

*analog-to-digital converter means coupled to said conversion means for converting said electrical signal to digital data;*

*quantization means for quantizing the output of said analog-to-digital converter means and for producing a digital quantization data signal;*

*pitch extraction means coupled to said quantization means for extracting pitch data from said digital quantization data signal, and for producing an output corresponding to the extracted pitch data;*

*processing means for producing the output of said pitch extraction means, said processing means including:*

*(a) an error eliminating means comprising memory means for storing past extracted pitch data,*

*(b) means for comparing said first extracted pitch data with present extracted pitch data, and*

*(c) selecting means for selectively delivering said past extracted pitch data or said present extracted pitch data in accordance with a result of said comparison,*

*said comparing means determining whether said present extracted pitch data is within a predetermined range with regard to said past extracted pitch data; and*

*designating means for designating the pitch of a sound to be obtained based on the pitch data derived from the processing means.*

*27. An electronic musical instrument comprising:*

*conversion means for converting musical sound having a pitch to a corresponding electrical signal;*

*analog-to-digital converter means coupled to said conversion means for converting said electrical signal to a digital signal;*

*quantization means for quantizing the output of said analog-to-digital converter means and for producing a digital data signal;*

*pitch extraction means coupled to said quantization means for extracting a pitch signal from said digital signal, and for producing an output corresponding to the extracted pitch signal;*

*processing means for processing the output of said pitch extraction means, said processing means including an averaging means for determining the average of a plurality of pitch signals output by said pitch extraction means to obtain an averaged pitch signal; and*

*designating means for designating the pitch of a sound to be obtained based on the averaged pitch signal.*

*28. An electronic musical instrument comprising:*

*conversion means for converting a musical sound having a pitch to a corresponding electrical signal;*

*analog-to-digital converter means coupled to said conversion means for converting said electrical signal to a digital signal;*

*quantization means for quantizing the output of said analog-to-digital converter means and for producing a digital data signal;*

*pitch extraction means coupled to said quantization means for extracting a pitch signal from said digital signal, and for producing an output corresponding to the extracted pitch signal;*

*power detecting means coupled to said analog-to-digital converter means for detecting power of the digital signal to generate a power signal which is proportional to the energy of the input signal; and*

*designating means for designating the pitch and the characteristic of a sound to be generated in accordance with the extracted pitch signal and the power signal.*

* * * * *

UNITED STATES PATENT AND TRADEMARK OFFICE

CERTIFICATE OF CORRECTION

PATENT NO. : RE.33,739

DATED : November 12, 1991

INVENTOR(S) : TAKASHIMA et al

It is certified that error appears in the above-identified patent and that said Letters Patent is hereby corrected as shown below:

Column 31, line 25 (claim 7), "is" should read --in--.

Column 31, line 27 (claim 7), "is" should read --in--.

Column 31, line 33 (claim 7), "is" should read --in--.

Signed and Sealed this

Eleventh Day of May, 1993

*Attest:*

Michael K. Kirk

MICHAEL K. KIRK

*Attesting Officer*

*Acting Commissioner of Patents and Trademarks*